United States Patent
Gottschlich et al.

(10) Patent No.: US 9,639,392 B2
(45) Date of Patent: May 2, 2017

(54) UNBOUNDED TRANSACTIONAL MEMORY WITH FORWARD PROGRESS GUARANTEES USING A HARDWARE GLOBAL LOCK

(71) Applicants: Justin E. Gottschlich, Santa Clara, CA (US); Irina Calciu, Santa Clara, CA (US); Tatiana Shpeisman, Menlo Park, CA (US); Gilles A. Pokam, Fremont, CA (US)

(72) Inventors: Justin E. Gottschlich, Santa Clara, CA (US); Irina Calciu, Santa Clara, CA (US); Tatiana Shpeisman, Menlo Park, CA (US); Gilles A. Pokam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 14/108,892

(22) Filed: Dec. 17, 2013

(65) Prior Publication Data

US 2015/0169362 A1 Jun. 18, 2015

(51) Int. Cl.
*G06F 9/52* (2006.01)
*G06F 9/46* (2006.01)

(52) U.S. Cl.
CPC .............. *G06F 9/467* (2013.01); *G06F 9/52* (2013.01); *G06F 9/528* (2013.01)

(58) Field of Classification Search
CPC ................................. G06F 9/467; G06F 9/528
See application file for complete search history.

(56) References Cited

U.S. PATENT DOCUMENTS

| 5,615,374 | A * | 3/1997 | Sadoi et al. ................... 710/200 |
| 7,739,456 | B1 * | 6/2010 | Cypher ................. G06F 9/3004 711/145 |
| 2006/0161740 | A1 * | 7/2006 | Kottapalli ............... G06F 9/528 711/152 |
| 2007/0226698 | A1 | 12/2007 | Shavit et al. |
| 2011/0016470 | A1 * | 1/2011 | Cain et al. .................... 718/101 |
| 2011/0055837 | A1 | 3/2011 | Kumar et al. |

(Continued)

OTHER PUBLICATIONS

Liu et al. "Toxic Transactions." Jun. 2011. https://www.cs.purdue.edu/sss/projects/transact11/web/papers/Liu.pdf.*

(Continued)

*Primary Examiner* — Nathan Sadler
(74) *Attorney, Agent, or Firm* — Lowenstein Sandler LLP

(57) ABSTRACT

A processing device implementing unbounded transactional memory with forward progress guarantees using a hardware global lock is disclosed. A processing device of the disclosure includes a hardware transactional memory (HTM) hardware contention manager to cause a bounded transaction to be translated to an unbounded transaction, the unbounded transaction to acquire a global hardware lock for the unbounded transaction, the global hardware lock read by bounded transactions that abort when the global hardware lock is taken. The processing device further includes an execution unit communicably coupled to the HTM hardware contention manager to execute instructions of the unbounded transaction without speculation, the unbounded transaction to release the global hardware lock upon completion of execution of the instructions.

17 Claims, 16 Drawing Sheets

(56) References Cited

U.S. PATENT DOCUMENTS

| | | | |
|---|---|---|---|
| 2011/0119452 A1* | 5/2011 | Heller, Jr. | 711/147 |
| 2011/0145637 A1* | 6/2011 | Gray et al. | 714/15 |
| 2011/0209155 A1* | 8/2011 | Giampapa et al. | 718/103 |
| 2013/0297967 A1 | 11/2013 | Heller, Jr. | |
| 2013/0339327 A1* | 12/2013 | Belmar | G06F 9/466 707/703 |
| 2015/0074366 A1* | 3/2015 | Calciu et al. | 711/163 |
| 2015/0100741 A1* | 4/2015 | Calciu et al. | 711/147 |

OTHER PUBLICATIONS

Lev et al. "PhTM: Phased Transactional Memory." Aug. 2007. https://www.cs.rochester.edu/meetings/TRANSACT07/papers/lev.pdf.*

Sean Lie. Hardware Support for Unbounded Transactional Memory. May 2004. MIT. Thesis.*

Blundell et al. "Unrestricted Transactional Memory: Supporting I/O and System Calls within Transactions." May 2006. University of Pensylvania. Technical Report TR-CIS-06-09.*

Colin Blundell. Mechanisms for Unbounded, Conflict-Robust Hardware Transactional Memory. Dec. 2010. University of Pennsylvania. Dissertation. Paper 253.*

Blundell et al. "Making the Fast Case Common and the Uncommon Case Simple in Unbounded Transactional Memory." Jun. 2007. ACM. ISCA '07. pp. 24-34.*

Microsoft. Microsoft Computer Dictionary. 2002. Microsoft. p. 298.*

Armejach, Adria, et al. "Techniques to Improve Performance in Requester-Wins Hardware Transactional Memory", ACM Transactions on Architecture and Code Optimization, Association for Computing Machinery, 25 pages, Dec. 1, 2013.

Gottschlich, Justin, et al. "An Efficient Software Transactional Memory Using Commit-Time Invalidation", Proceedings of the 8th Annual IEEE/ACM International Symposium on Code Generation and Optimization, CGO '10, 10 pages, Apr. 24, 2010.

Welc, Adam et al., "Irrevocable Transactions and their Applications", Proceedings of the Twentieth Annual Symposium on Parallelism in Algorithms and Architectures, SPAAA'08, 12 pages, Jun. 14, 2008.

European Search Report for European Patent Application No. 14191779.9, mailed Feb. 6, 2015, 10 pages.

Wang, et al., "Evaluation of Blue Gene/Q Hardware Support for Transactional Memories," Proceedings of the 21st International Conference on Parallel Architectures and Compilation Techniques, 2012, (PACT '12), 10 pages.

Ananian, et al., "Unbounded Transactional Memory," Proceedings of the 11th International Symposium on High-Performance Computer Architecture, Feb. 2005, (HPCA 2005), pp. 316-327.

Hammond, et al., "Transactional Memory Coherence and Consistency," Proceedings of the 31st Annual International Symposium on Computer Architecture, 2004, (ISCA '04), 12 pages.

Blundell, et al., "Making the Fast Case Common and the Uncommon Case Simple in Unbounded Transactional Memory," Proceedings of the 34th Annual International Symposium on Computer Architecture, vol. 35, Issue 2, Jun. 9-13, 2007, (ISCA '07), 11 pages.

Bobba, et al., "TokenTM: Efficient Execution of Large Transactions with Hardware Transactional Memory," International Symposium on Computer Architecture (ISCA '08), Jun. 2008, vol. 36, Issue 3, pp. 1-12.

Ceze, et al., "Bulk Disambiguation of Speculative Threads in Multiprocessors," Proceedings of the 33rd Annual International Symposium on Computer Architecture (ISCA '06), May 2006, vol. 34, Issue 2, 12 pages.

Chuang, et al., "Unbounded Page-Based Transactional Memory," Proceedings of the 12th International Conference on Architectural Support for Programming Languages and Operating Systems (ASPLOS XII), Oct. 21-25, 2006, pp. 1-12.

Chung, et al., "Tradeoffs in Transactional Memory Virtualization," Proceedings of the 12th International Conference on Architectural Support for Programming Languages and Operating Systems (ASPLOS XII), Oct. 21-25, 2006, vol. 34, Issue 5, 18 pages.

Liu, et al., "Hardware Transactional Memory Supporting I/O Operations within Transactions," Proceedings of the 2008 10th IEEE International Conference on High Performance Computing and Communications (HPCC '08), Sep. 25-27, 2008, pp. 85-92. (Abstract only).

Moore, et al., "LogTM: Log-Based Transactional Memory," 12th Annual International Symposium on High-Performance Computer Architecture, Feb. 11-15, 2006, 12 pages.

Yen, et al., "LogTM-SE: Decoupling Hardware Transactional Memory from Caches," Proceedings of the 2007 IEEE 13th International Symposium on High Performance Computer Architecture (HPCA '07), Feb. 10-14, 2007, 12 pages.

Rajwar, et al., "Virtualizing Transactional Memory," IEEE Proceedings of the 32nd Annual International Symposium on Computer Architecture (ISCA '05), May 2005, vol. 33, Issue 2, 12 pages.

Volos, et al., "xCalls: Safe I/O in Memory Transactions," Proceedings of the 4th ACM European Conference on Computer Systems (EuroSys '09), Apr. 1-3, 2009, pp. 247-260.

Wang, et al., "Software Assisted Transact Cache to Support Efficient Unbounded Transactional Memory," Proceedings of the 200810th IEEE International Conference on High Performance Computing and Communications (HPCC '08), Sep. 2008, pp. 77-84. (Abstract only).

Wang, et al., "DTM: Decoupled Hardware Transactional Memory to Support Unbounded Transaction and Operating System," Parallel Processing, (ICPP '09), Sep. 22-25, 2009, pp. 228-236. (Abstract only).

Blundell, "Mechanisms for Unbounded, Conflict-Robust Hardware Transactional Memory," Dissertation, 2010, 24 pages, pp. i-4.

Liu, et al., "Hardware Transactional Memory Supporting I/O Operations within Transactions," Proceedings of the 2008 10th IEEE International Conference on High Performance Computing and Communications (HPCC '08), Sep. 25-27, 2008, pp. 85-92.

Wang, et al., "Software Assisted Transact Cache to Support Efficient Unbounded Transactional Memory," Proceedings of the 20081oth IEEE International Conference on High Performance Computing and Communications (HPCC '08), Sep. 2008, pp. 77-84.

Wang, et al., "DTM: Decoupled Hardware Transactional Memory to Support Unbounded Transaction and Operating System," Parallel Processing, (ICPP '09), Sep. 22-25, 2009, pp. 228-236.

Blundell, "Mechanisms for Unbounded, Conflict-Robust Hardware Transactional Memory," Dissertation, 2010, 24 pages. pp. i-4.

Harris et al. "Svnthesis Lectures on Comouter Architecture" Transactional Memory 2nd edition Moraan & Claypool, Dec. 2010, 263 pages.

* cited by examiner

400

OPTIMIZED BOUNDED HW TX

Try_SPEC:
    Speculate critical section
    *Transactional_Read(HWLock)*
    *IF HWLock is taken ABORT*
    End speculation
On_ABORT:
    Increment re-try counter
    Consult retry policy
    Become unbounded TX
        Clear re-try counter

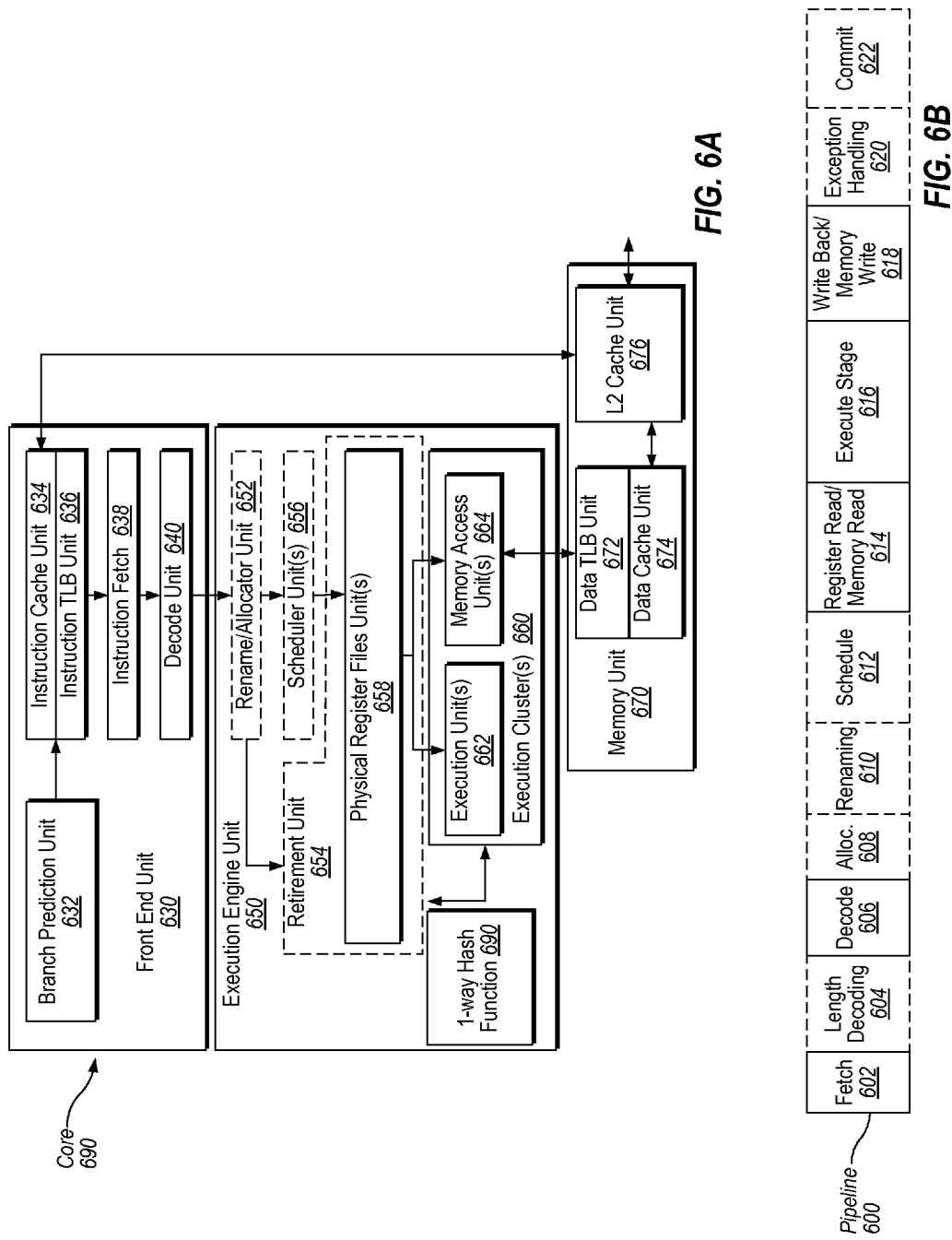

UNBOUNDED TRANSACTIONAL MEMORY WITH FORWARD PROGRESS GUARANTEES USING A HARDWARE GLOBAL LOCK

TECHNICAL FIELD

The embodiments of the disclosure relate generally to processing devices and, more specifically, relate to unbounded transactional memory with forward progress guarantees using a hardware global lock.

BACKGROUND

To improve performance, some computer systems may execute multiple threads concurrently. Generally, before a thread accesses a shared resource, it may acquire a lock of the shared resource. In situations where the shared resource is a data structure stored in memory, all threads that are attempting to access the same resource may serialize the execution of their operations in light of mutual exclusivity provided by the locking mechanism. This may be detrimental to system performance and may cause program failures, e.g., due to deadlock bugs.

To reduce performance loss resulting from utilization of locking mechanisms, some computer systems may use transactional memory. Transactional memory generally refers to a synchronization model that allows multiple threads to concurrently access a shared resource without utilizing a locking mechanism. Transactional memory execution in processors, however, may add complexity to a design, for example, due to mispredictions resulting from speculative processing.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6A is a block diagram illustrating a micro-architecture for a processor that implements unbounded transactional memory with forward progress guarantees using a hardware global lock in which one embodiment of the disclosure may be used.

FIG. 6B is a block diagram illustrating an in-order pipeline and a register renaming stage, out-of-order issue/execution pipeline implemented according to at least one embodiment of the disclosure.

DETAILED DESCRIPTION

Figure 1:
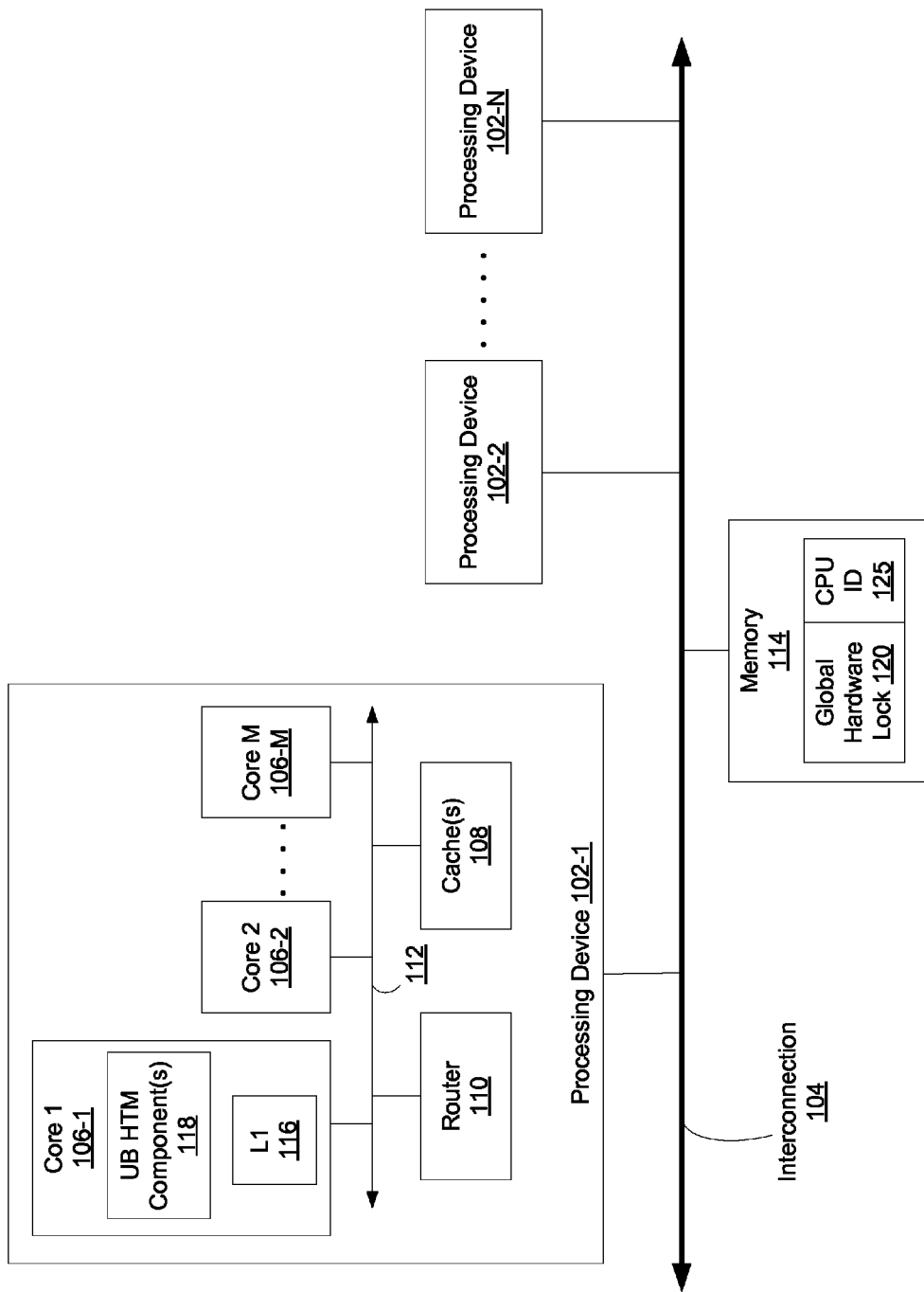
FIG. 1 illustrates a block diagram of a computing system, according to an embodiment of the disclosure.

Embodiments of the disclosure implement techniques for unbounded transactional memory with forward progress guarantees using a hardware global lock in a processing device. Traditionally, synchronization between threads accessing shared memory has been realized using locks to protect the shared data from simultaneous access. However, locks can cause unnecessary serialism in the system or can be overly-complicated for programmers to implement correctly. Transactional memory has been proposed as an alternative solution to locks, and allows threads to speculatively execute critical sections, called transactions, in parallel. If a conflict occurs at run-time, then threads stall or roll back their transactions and execute them again to resolve the conflict. One type of TM is software transactional memory (STM), where transactions are implemented entirely in software to synchronize shared memory in multithreaded programs. However, STM can incur large amounts of overhead, which preclude STM being used as a general solution.

Recently, hardware vendors have provided best-effort hardware transactional memory (HTM) in processing devices. Best-effort HTM can deliver better performance than STM, but makes no forward-progress guarantees; that is, the present HTM implementations cannot guarantee a transaction will commit, no matter how many times it is re-executed. ("Best-effort" refers to the concept that the HTM system tries its best, but cannot guarantee that a transaction commits.) For instance, transaction T1 may be aborted by transaction T2, which might be then aborted by the re-started transaction T1, and so on. Without forward progress guarantees, best-effort HTMs can degrade to livelock. In addition, hardware transactions, in general, can abort for a variety of reasons: true or false conflicts, overflows, illegal instructions, etc.

As a result, current best-effort HTMs typically provide a fallback software path to address the lack of forward progress guarantees and to ensure hardware transactions that cannot commit in hardware will eventually commit using software. Such systems are called hybrid TMs (HyTM), which use both hardware and software transactions. Many HyTM algorithms have been proposed, but they tend to have the disadvantage of notably complicating the TM space and introducing overhead through the requisite of synchronizing hardware and software transactions.

Previous unbounded (i.e., no limit on transaction size) HTM proposals that do not rely on a software fallback option implement changes to the cache coherency protocol and/or complex metadata, so they are not practical solutions. In contrast, embodiments of the disclosure provide unbounded HTM with forward progress guarantees using a hardware global lock in a processing device. Specifically, embodiments of the disclosure execute one unbounded transaction in hardware, without marking transactional bits in the cache, in parallel with multiple bounded transactions (which are executed speculatively). A single global hardware lock is acquired by the unbounded transaction and should be read by the bounded transactions before they commit to detect potential conflicts between the unbounded transaction and the bounded ones. The unbounded HTM of embodiments of the disclosure can be implemented in existing HTM systems with minimal changes and without changing the cache coherence protocol of these systems (which is used to detect conflicts and enforce memory coherency).

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations described below.

Although the following embodiments are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1 illustrates a block diagram of a computing system 100, according to an embodiment of the disclosure. The system 100 may include one or more processing devices 102-1 through 102-N (generally referred to as "processors 102" or processing devices 102"). The processors 102 may communicate via an interconnection or bus 104. Each processor 102 may include various components some of which are discussed with to processor 102-1 for clarity. Accordingly, each of the remaining processors 102-2 through 102-N may include the same or similar components discussed with references to process 102-1.

In one embodiment, processor 102-1 may include one or more processor cores 106-1 through 106-M (referred to herein as "cores 106", or more generally as "core 106"), a cache 108 (which may include one or more private or shared caches), and/or a router 110. The processor cores 106 may be implemented on a single integrated circuit (IC) chip. Moreover, the IC may include one or more shared and/or private caches (such as cache 108), buses or interconnections (such as a bus or interconnection 112), memory controllers, or other components.

The router 110 may be used to communicate between various components of the processors 102-1 and/or system 100. Moreover, the processors 102-1 may include more than one router 110. Furthermore, the multitude of router 110 may be in communication to enable data routing between various component inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via interconnection 104. In one embodiment, the cache 108 may be a last level cache (LLC). Also, each of the cotes 106 may include a level 1 (L1) cache 116 (generally referred to herein as "L1 cache 116"). Furthermore, the processor 102-1 may also include a mid-level cache that is shared by several cores 106. Various components of the processor 102-1 may communicate with the cache 108 directly, through a bus (e.g., bus 112), and/or a memory controller or hub.

In one embodiment, processing device 102-1 implements unbounded HTM. As discussed above, HTM is implemented in hardware and allows threads to speculatively execute critical sections, called transactions, in parallel. If a conflict occurs at run-time, then threads stall or roll back their transactions and execute them again to resolve the conflict. The unbounded HTM of embodiments utilizes a traditional bounded HTM design and then incorporates serialized unbounded hardware transactions to it. Boundedness refers to a limit (implicit or explicit) placed on a size (e.g., number of operations, etc.) of the transaction executing under the HTM design. For example, due to size constraints of the cache, there is a limit to the write set (memory store access made by the transaction) of a transaction that can be tracked by hardware (e.g., the cache, such as L1 cache 116, in some HTM implementations). Once this limit is reached, the transaction must be aborted because the hardware can no longer accurately track memory accesses of the transaction, thus preventing accurate rollback of the transaction if a conflict occurs. As discussed above, prior HTM solutions provide fallback software to work around this boundedness issue. An unbounded transaction includes a transaction that can execute without any limits to the size of the transaction.

In one embodiment, the unbounded HTM of embodiments of the disclosure utilizes additional unbounded (UB) HTM components 118 to execute one unbounded transaction in hardware unspeculatively (e.g., without marking transactional bits in L1 cache 116), in parallel with multiple bounded transactions. The UB HTM components 118 may include a re-try counter and logic to implement a hardware contention manager, as discussed further below with respect to FIG. 2. A global hardware lock (GHWL) 120 in memory 114 is acquired by the unbounded transaction, and should be read by all bounded transactions before they commit. To avoid races between bounded transactions and the unbounded transaction, bounded transactions transactionally read the GHWL 120 to see if it is held. If the GHWL 120 is taken, which indicates an unbounded transaction is executing, the bounded transactions should abort to avoid undetected conflicts. In some implementations, a CPU ID 125 is also associated with the GHWL 120, and may be utilized to identify the core 106 that is executing in unbounded mode for purposes of determining when a thread should release the GHWL 120, as discussed further below. As the unbounded transaction is not executed speculatively, it always commits, thereby providing a forward progress guarantee. With this approach, bounded hardware transactions still execute in parallel, as in the original HTM designs, so no parallelism is lost when executing only these types of transactions.

Figure 2:
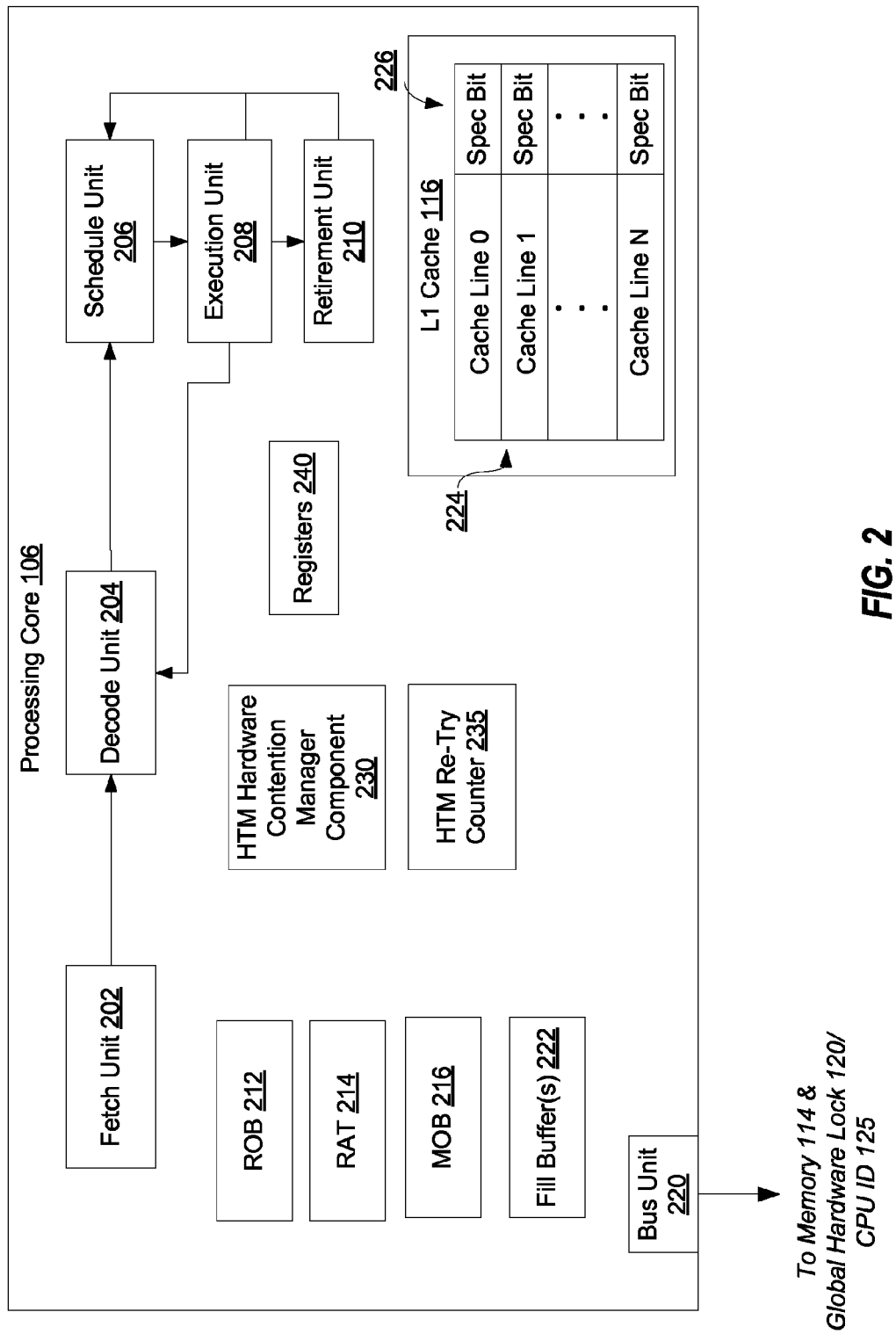
FIG. 2 is a flow diagram illustrates a block diagram of a processor core, according to an embodiment of the disclosure.

FIG. 2 illustrates a block diagram of a processor core 106, according to an embodiment of the disclosure. In one embodiment, processor core 106 is the same as processor core 106 described with respect to FIG. 1. The arrows shown in FIG. 2 may illustrate the flow of instructions through the core 106. One or more processor cores (such as the processor core 106) may be implemented on a single IC chip (or die) s discussed with reference to FIG. 1. Moreover, the chip may include one or more shared and/or private caches (e.g., cache 108 of FIG. 1), interconnections (e.g., the interconnections 104 and/or 112 of FIG. 1), memory controllers, or other components. In one embodiment, processor core 106 shown in FIG. 2 may be utilized to provide unbounded transactional memory with forward progress guarantees using a hardware global lock.

As illustrated in FIG. 2, the processor core 106 may include a fetch unit 202 to fetch instructions for execution by the core 106. The instructions may be fetched from any storage device, such as memory 114 of FIG. 1 and/or other memory devices. The core may also include a decode unit 204 to decode the fetched instruction. For instance, the decode unit 204 may decode the fetched instruction into a plurality of micro-operations (uops).

Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. Further, the execution unit 208 may execute instructions out-of-order. Hence, the processor core 106 may be an out-of-order processor core in one embodiment.

The core 106 may also include a retirement unit 210. The retirement unit 210 may retire executed instructions after they are committed. In an embodiment, retirement of the executed instructions may result in processor state being committed from the execution of the instructions, physical registers used by the instructions being deallocated, etc.

As shown in FIG. 2, the core 106 may include a reorder buffer (ROB) 212 to store information about in-flight instructions (or uops) for access by various components of the core 106. The core 106 may further include a register alias table (RAT) 214 to maintain a mapping of logical (or architectural) registers (such as those identified by operands of software instructions) to corresponding physical registers. In one embodiment, each entry in the RAT 214 may include a ROB identifier assigned to each physical register. Additionally, a memory order buffer (MOB), which may include a load buffer or a store buffer, may store pending memory operations that have not loaded or written back to memory (e.g., a memory that is external to the core 106, such as memory 114).

Furthermore, the core 106 may include a bus unit 220 to allow communication between components of the core 106 and other component (such as the components discussed with respect to FIG. 1) via one or more buses (e.g., buses 104 and/or 112) from the memory 114 prior to storing the received data into the cache 116.

The L1 cache 116 may include one or more cache lines 224 (e.g., cache lines 0 through N). In one embodiment, each cache line 224 may include a speculation bit 226 for each thread executing on the core 106. Speculation bit 226 may be set or cleared to indicate access (load and/or store) to the corresponding cache line by a transactional memory access request. Even though the cache lines 224 are shown as having a respective speculation bit 226, other configurations are also possible. For example, a cache line 224 may have a transaction read bit and a transaction write bit. As another example, the speculation bit 226 may correspond to a select portion of the cache 116, such as a cache block or other portion of the cache 116. Also, the speculation bit 226 may be stored in locations other than the cache 116, such as in the cache 108 of FIG. 1, the memory 114, or a victim cache, for example.

The core 106 may also implement cache-based HTM for the embodiments of bounded transactions. Transactional operations are marked by setting transactional bits, such as the speculation bit 226, associated with cache lines 224. In some embodiment, conflicts may be detected at the granularity of a cache line using a cache coherency protocol. If a transactionally-accessed cache line 224 gets evicted, the transaction then aborts. Instead of utilizing a software fall-back upon abort of a transaction, embodiments of the disclosure introduce a HTM hardware contention manager component 230 and an HTM re-try counter 235 to implement the unbounded transactional memory with forward progress guarantees using a hardware global lock (GHWL), such as GHWL 120 of FIG. 1. The HTM hardware contention manager component 230 considers the abort reason, in some cases, and decides whether to use a retry policy tracked with HTM re-try counter 235 (e.g., in the case of a conflict) or to start an unbounded transaction. The GHWL 120 also should be transactionally read by all bounded transactions to correctly synchronize with unbounded transactions.

Figure 3A:
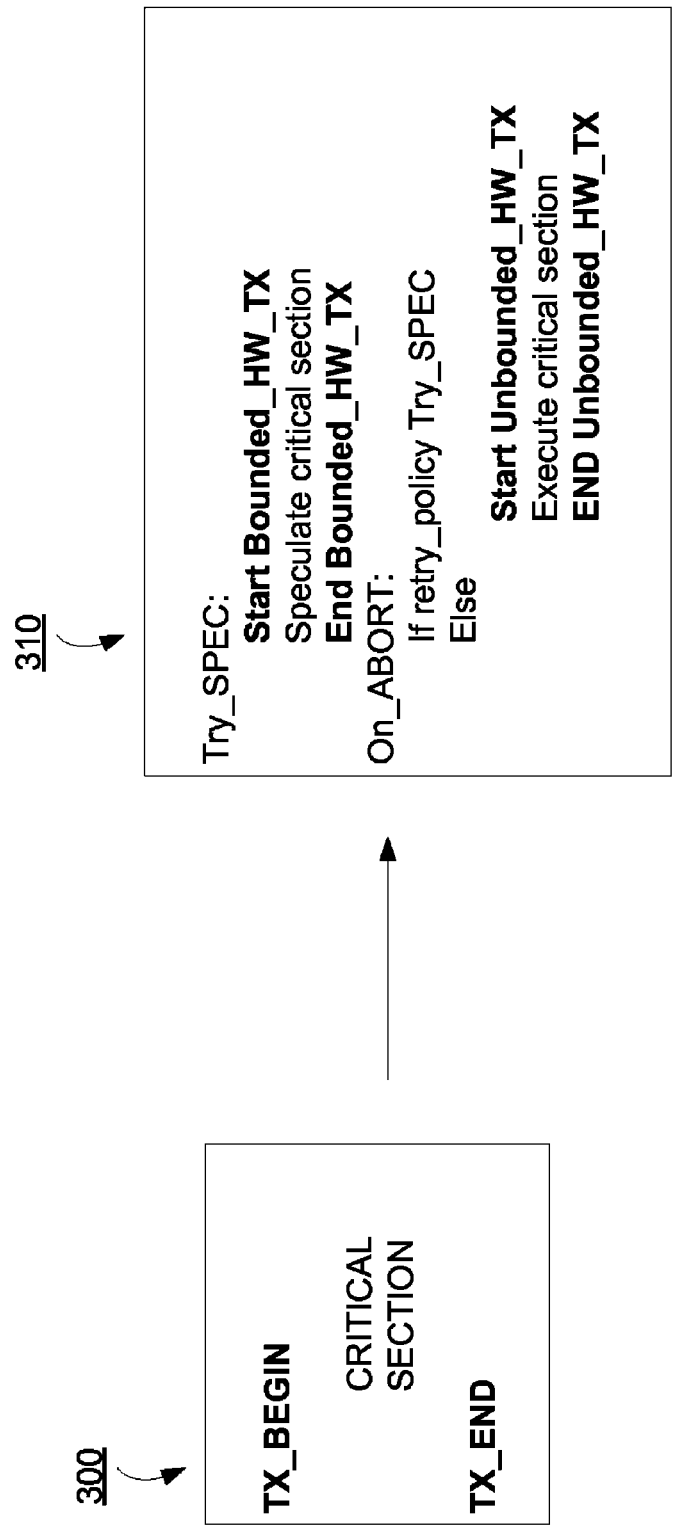
FIG. 3A is example pseudo-code listings illustrating the syntax of a transaction, according to an embodiment of the disclosure.

FIG. 3A is example pseudo-code listings illustrating the syntax of a transaction. As shown in code listing 300 provides an example of software code that executes a transaction, and code listing 310 provides the corresponding hardware translation of the software listing 300 by a processing device, such as core 106. Embodiments of the disclosure are not limited to the specific instruction phrasing and/or terminology provided in listings 300, 310, and may implement other variations of these instructions. As illustrated in software listing 300, the critical section is initiated by a TX_BEGIN to denote a transaction start, and ended by TX_END to denote the end of a transaction.

Figures 3B, 3C:
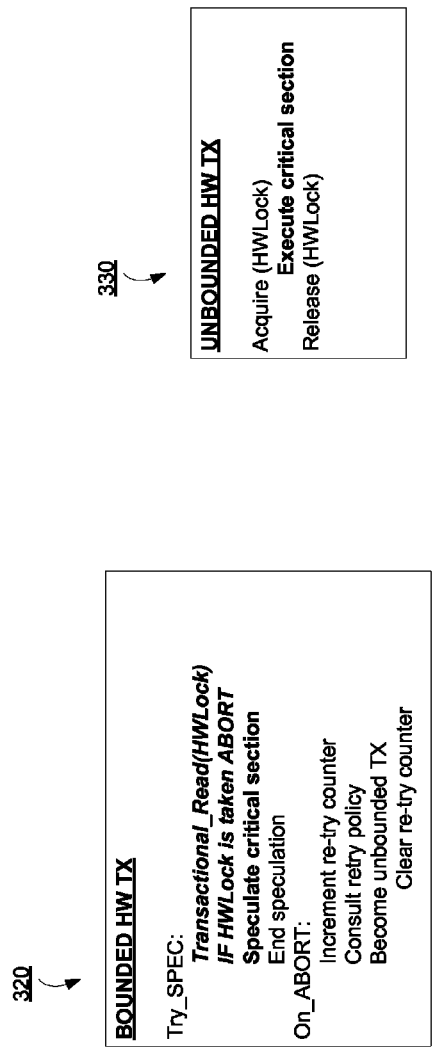
FIG. 3B is an example pseudo-code listing of the hardware instructions associated with a bounded transaction, according to an embodiment of the disclosure.
FIG. 3C is an example pseudo-code listing of hardware instructions associated with an unbounded transaction, according to an embodiment of the disclosure.

Hardware listing 310 depicts that, upon first execution, these instructions (e.g., TX_BEGIN) initiate a bounded hardware transaction. FIG. 3B is an example pseudo-code listing of the hardware instructions associated with a bounded transaction. A thread executing a bounded hardware transaction can start speculation when the GHWL 120 is free. In one implementation, as part of the critical section speculation, an instruction to enable speculative writes (e.g., "enable_spec_writes") is executed by the core 116, which causes the transactional operations to be tracked by setting transactional bits, such as the speculation bit 226, associated with cache lines 224 of the L1 cache 116 (or any other cache and/or memory utilized to implement the HTM) accessed by the corresponding transactional operations.

If the transaction does not commit and aborts because of a conflict (as indicated by a hardware abort status, which may be stored in a specialized register 240 of core 106), then the HTM re-try counter 235 may be incremented. The HTM re-try counter 235 may be an accumulator that tracks aborts on a per-transaction basis. A retry policy, which may be implemented by HTM hardware contention management component 230, determines whether this transaction should be retried as a bounded hardware transaction or if it should be restarted as an unbounded hardware transaction. In some embodiments, the HTM re-try counter 235 may be referenced to determine whether a threshold number of transaction re-tries has been reached. If so, then the bounded transaction may be transformed to an unbounded transaction with forward progress guarantee and the HTM re-try counter 235 is reset.

In other embodiments, if the abort reason is an unsupported instruction or overflow, the transaction is restarted as an unbounded hardware transaction directly and the HTM re-try counter 235 is reset. These bounded-to-unbounded transaction transformations are transparent to the programmer, and may be managed by HTM hardware of the core 106, such as HTM hardware content manager component 230.

Embodiments of the disclosure support the concurrent execution of one unbounded transaction with any number of bounded transactions. A thread that executes an unbounded transaction should acquire the GHWL 120 to ensure there is no other unbounded transaction running at the same time, as shown in example pseudo-code listing 330 of hardware instructions associated with an unbounded transaction in FIG. 3C. The unbounded transaction performs all writes in place (i.e., non-speculatively), making them visible to concurrent readers (e.g., other threads). For this reason, unbounded transactions cannot abort in embodiments of the disclosure.

Furthermore, unbounded transactions do not mark the transactional bits, such as speculation bits 226, in the cache lines 224 that they access. In one embodiment, this is because the HTM does not execute the instruction to enable speculative writes (e.g., "enable_spec_writes") when starting the unbounded transaction. Therefore, cache lines 224 that are accessed by unbounded transactions can be evicted from the cache 116 without consequences.

In some embodiments, when a transaction ends (e.g., as part of the TX_END routine provided by hardware of the core 106), the transaction may check if the GHWL 120 is taken and also compare a CPU ID of the core 106 to a the CPU ID 125 stored with the GHWL 120. If there is a match, then the thread would know that it is an unbounded and would clear out the CPU ID 125 and release the GHWL 120. If there is not a match or if the CPU ID is all zeros, then the thread would know it is in bounded mode and would commit changes in the cache 116 that are marked as speculative into memory, among other tasks performed as part of the transaction end.

As a result of the above-describe implementations, unbounded transactions do not abort on cache and associativity overflows. Because unbounded transactions cannot be aborted, they also support instructions that are illegal in the bounded transactions, such as system calls and I/O. Finally, a bounded transaction that aborts repeatedly because of conflicts can be restarted as an unbounded transaction (e.g., utilizing the re-try policy and re-try counter described above), guaranteeing that it will succeed; this property ensures forward progress.

With a naïve approach using this design, races should be avoided between the unbounded transaction and bounded transactions. This can be handled by the bounded transactions reading the GHWL 120 (transactionally) as discussed above, thereby preventing bounded transactions from executing in parallel with the unbounded transaction. When the bounded transaction reads the GHWL 120 at the beginning of execution, the GHWL 120 is added to the read set of the transaction. If a bounded transaction begins execution while the GHWL 120 is not held and it is subsequently acquired (i.e., an unbounded transaction begins), the bounded transaction consequently aborts due to the transactional conflict identified in the HTM due to a conflict on the GHWL 120 address within the bounded transaction's read set. This conflict is automatically found by the coherence protocol used in by the core 106 and HTM implementation.

In some implementations, the reading of the GHWL 120 can be optimized to support the concurrent execution of bounded transactions along with the single unbounded transaction. Rather than eagerly aborting such transactions by requiring bounded transactions read the GHWL 120 at transaction start-time, embodiments of the disclosure observe that correctness is ensured if the GHWL 120 is read at a bounded transaction's commit-time. As a result, the HTM can run any number of bounded transactions concurrently with one unbounded transaction.

Figure 4A:
FIG. 4A is an example pseudo-code listing of an optimized bounded transaction execution, according to an embodiment of the disclosure.
Figure 4C:
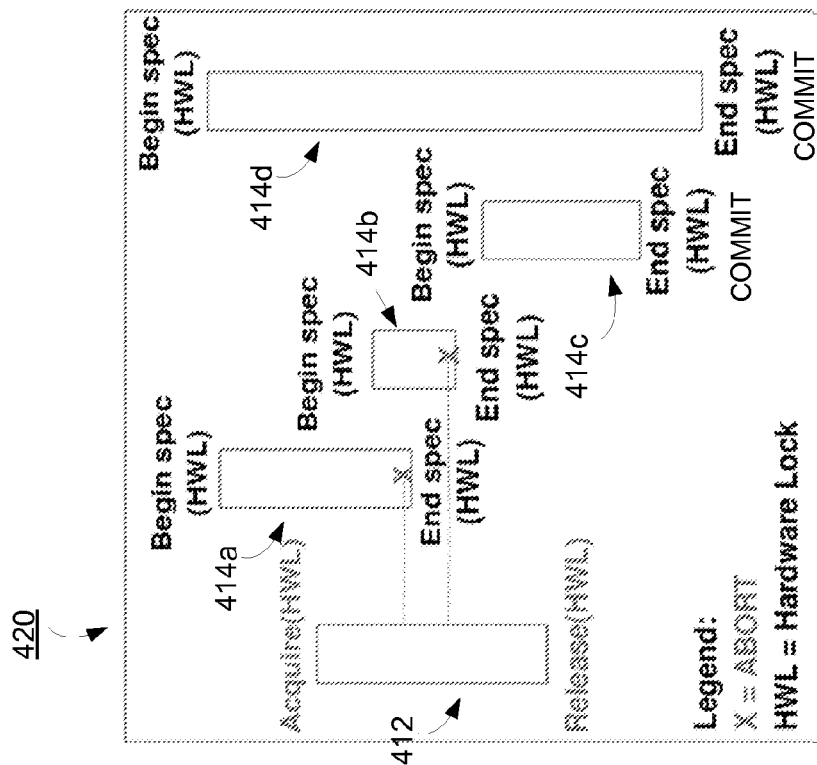
FIGS. 4B and 4C are block diagrams conceptually illustrating example scenarios of a global hardware lock read in both unoptimized and optimized form, according to an embodiment of the disclosure.
Figure 4B:
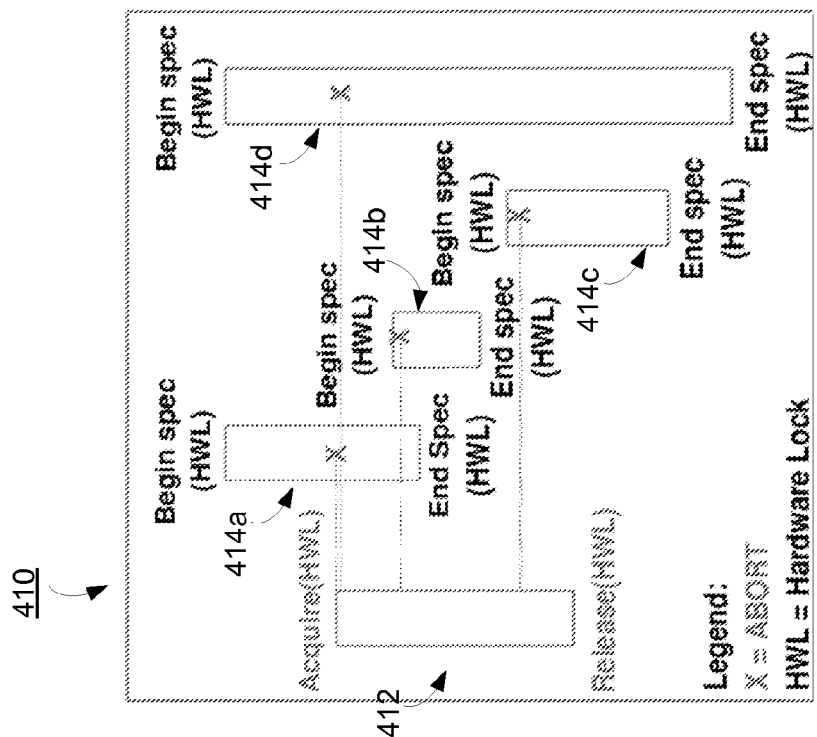

In particular, as shown in the pseudo-code listing 400 of FIG. 4A, if bounded transactions read the GHWL 120 transactionally after executing the critical section instead of before, then there is some concurrency possible between the different types of transactions. In this setting, the unbounded transaction must make its changes visible to the bounded transaction in order to maintain serializability; therefore speculative execution of the unbounded transaction is not possible. FIGS. 4B and 4C are block diagrams conceptually illustrating example scenarios in which this GHWL read optimization allows for more concurrency.

Referring to FIG. 4B, an unoptimized GHWL read example 410 illustrates possible overlaps between one unbounded transaction 412 and multiple bounded transactions 414*a*-*d*. In one embodiment, each transaction is executed by a different core of one or more processing devices. Example 410 illustrates that all bounded transactions 414*a*-*d* that started execution before the GHWL 120 was acquired are rolled back as soon as the GHWL 120 is acquired by bounded transaction 412. In addition, while the GHWL 120 is taken, no threads can start executing in speculative mode (bounded mode).

Referring to FIG. 4C, an optimized GHWL read example 420 illustrates the same bounded transaction 412 and unbounded transaction from example 410 of FIG. 4B, but the bounded transactions 414*a*-*d* in this example 420 read the GHWL 120 after executing the critical section. As illustrated, the bounded transactions 414*a, b* that start before the GHWL 120 lock 120 is acquired rollback only if the critical section ends before the lock is released. Other threads running bounded transactions 414*c, d* can still start speculation and commit successfully as long as their critical section ends after the lock is released.

Figure 5A:
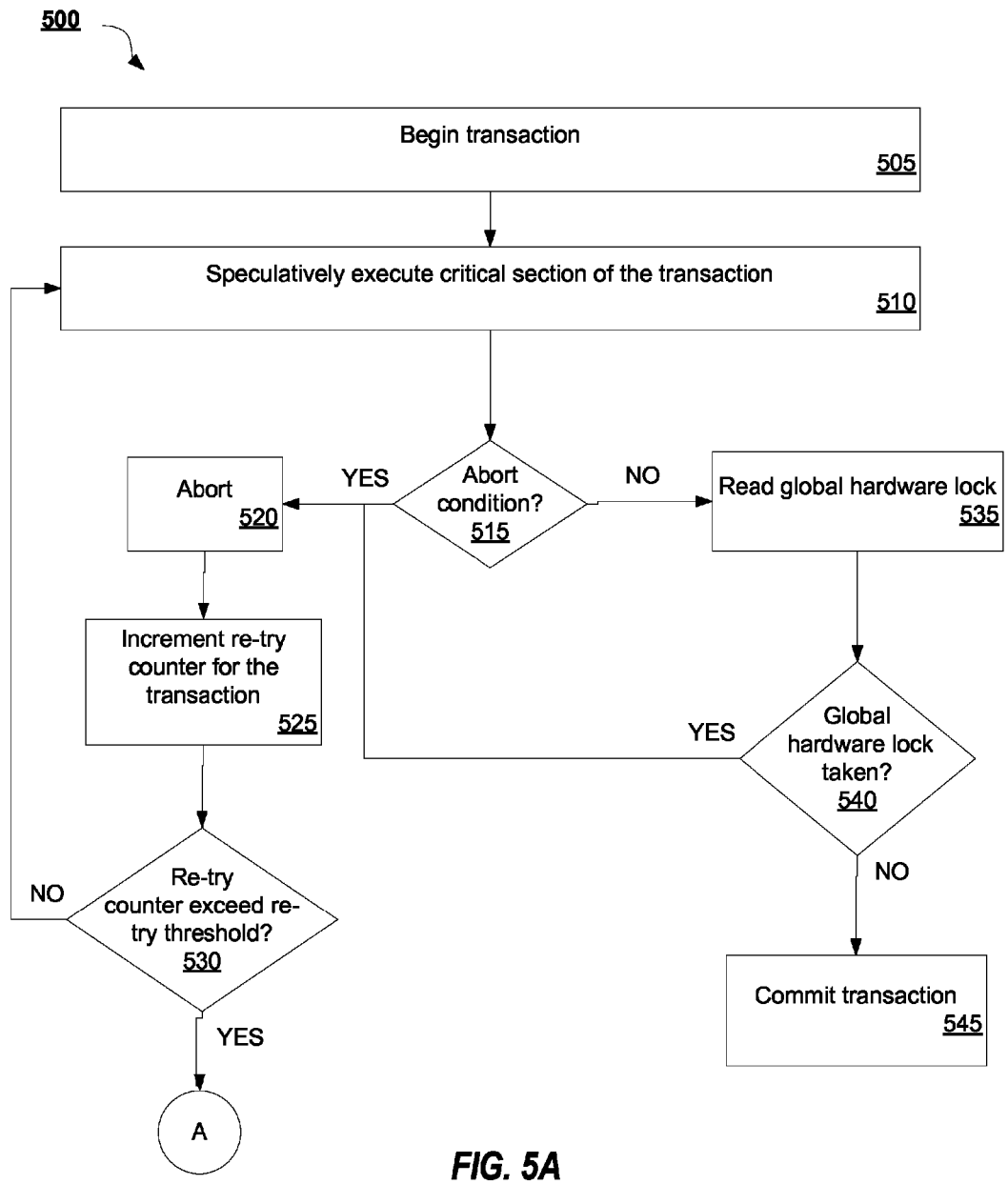
FIGS. 5A and 5B are flow diagrams illustrating a method for implementing unbounded transactional memory with forward progress guarantees using a hardware global lock according to an implementation of the disclosure
Figure 5B:
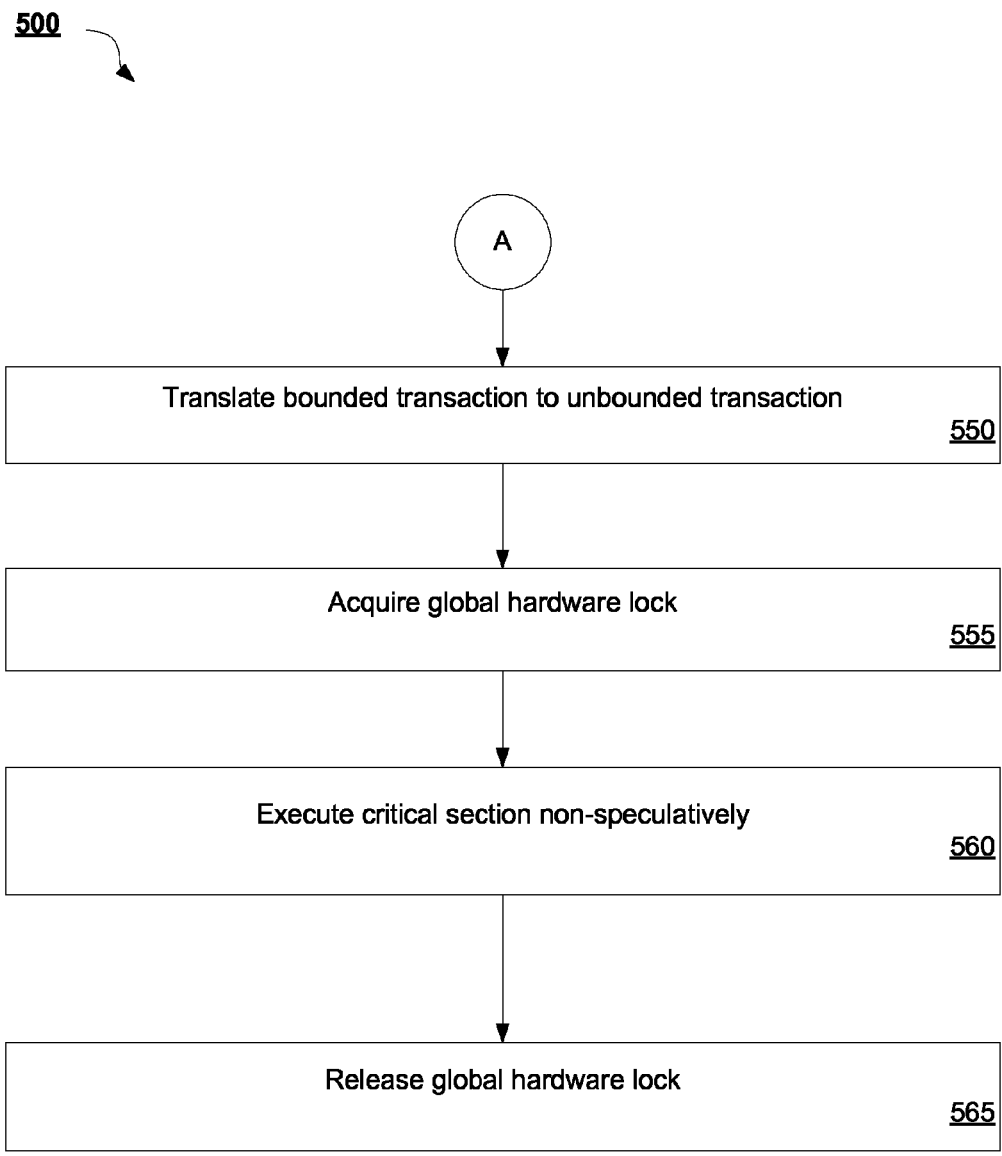

FIGS. 5A and 5B are flow diagrams illustrating a method 500 for implementing unbounded transactional memory with forward progress guarantees using a hardware global lock according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by core 106 of FIGS. 1 and 2.

Method 500 begins at block 505 where a transaction begins execution in the core. In one embodiment, a TX_BEGIN instruction initiates the transaction execution using HTM of the core 106. At block 510, the critical section of the transaction is executed speculatively. In one embodiment, an instruction to enable speculative writes is issued as part of the speculative execution of the critical section of the transaction. The speculative writes cause a speculative bit in the cache line associated with the transaction writes to be set, those indicating cache lines that should be cleared upon abort of the transaction or committed (sent to main memory) upon commitment of the transaction.

At decision block 515, it is determined whether any abort conditions are encountered during the speculative execution of the critical section. Abort conditions may include memory access conflicts, unsupported (illegal) instructions, overflow conditions, and so on. If any abort conditions occur at decision block 515, then method 500 proceeds to block 520 to abort the transaction. At block 525, a re-try counter for the transaction is incremented. In one embodiment, the re-try counter may be an accumulator implemented in the core 106. At decision block 525, it is determined whether the re-try counter exceeds a re-try threshold. This re-try threshold may be programmed into the core 106, or may be a maximum amount the accumulator can hold. If the re-try counter has not exceeded the threshold, then method 500 returns to block 510 to re-try speculative execution of the critical section of the transaction. If the re-try counter does exceed the re-try threshold, the method 500 may proceed to block 550 to execute the transaction in unbounded mode as will be discussed further below.

In some implementations, certain types of abort conditions may result in bypassing the re-try counter and cause an immediate transformation of the transaction into the unbounded mode. For example, execution of unsupported instructions or overflow conditions may cause the transaction to skip the re-try policy and immediately transform into an unbounded transaction. This may be because no amount of re-try for these types of abort conditions cures the transition abort condition. In some embodiments, a code representing the abort condition for a transaction is saved in a specialized register of the core 106.

Referring back to decision block 515, if an abort condition does not occur during the speculative execution of the critical section, method 500 proceeds to block 535 to read a global hardware lock (GHWL). In one embodiment, the GHWL is maintained in main memory of the processing device. In other embodiment, the global hardware lock is maintained in a location that is accessible to multiple threads of a processing device. At decision block 540 it is determined whether the GHWL is taken. If so, then an abort condition arises and method 500 returns to block 520 to abort the transaction. On the other hand, if the GHWL is not taken at decision block 540, then method 500 proceeds to block 545 to commit the transaction. In one embodiment, committing the transaction includes committing the speculative executed cache lines into memory, and clearing the speculative bits in the cache. In some embodiments, even though not specifically illustrated, the read of the GHWL may occur as part of the beginning of a transaction, prior to speculative execution of the critical section. In this case, if the GHWL is taken, the transaction aborts prior to speculative execution of the critical section. If the GHWL is not taken, then the GHWL is added to the read set of the transaction for use by the cache coherency protocol to identify conflicts (e.g., if the GHWL is acquired during the transaction execution, the transaction should abort).

Referring back to block 525, if the re-try counter does exceed the re-try threshold (or if an abort condition causes immediate transformation to an unbounded transaction), then method 500 proceeds to block 550 to begin execution of the transaction in an unbounded mode. At block 550, the bounded transaction is transformed into an unbounded transaction. In one embodiment, as part of the unbounded mode, a transaction is executed without issuing an enable speculative writes instruction, so that memory access requests associated with the transaction commit to memory without marking any speculative bits in the cache. At block 555, the transaction acquires the GHWL. In one embodiment, if the GHWL is already acquired by another thread, then the thread of the requesting transaction waits (e.g., spins on the lock, is added to a wait queue, etc.) until the GHWL is released.

At block 560, the critical section of the transaction is executed non-speculatively. As discussed above, the transaction is executed without issuing an enable speculative writes instructions, thereby causing the transaction to execute non-speculatively and the memory access requests commit to memory without any possibility of rollback or abort. At block 565, the transaction releases the GHWL. In one embodiment, as part of a transaction end procedure, all executing transaction compare a CPU ID of the core executing the transaction with a CPU ID associated with the GHWL. If these CPU IDs match, the thread is then aware that is should release the GHWL as part of the transaction end procedure. If the CPU IDs do not match or the CPU ID associated with the GHWL is all zeros, then the thread does not release the GHWL lock (as it does not own the lock).

FIG. 6A is a block diagram illustrating a micro-architecture for a processor 600 that implements unbounded transactional memory with forward progress guarantees using a hardware global lock in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, core 690 may be the same as processor cores 106 described with respect to FIGS. 1 and 2. In particular, core 690 may include unbounded HTM components described with respect to FIGS. 1 and 2, to implement unbounded transactional memory with forward progress guarantees using a hardware global lock described with respect to implementations of the disclosure.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processing device 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
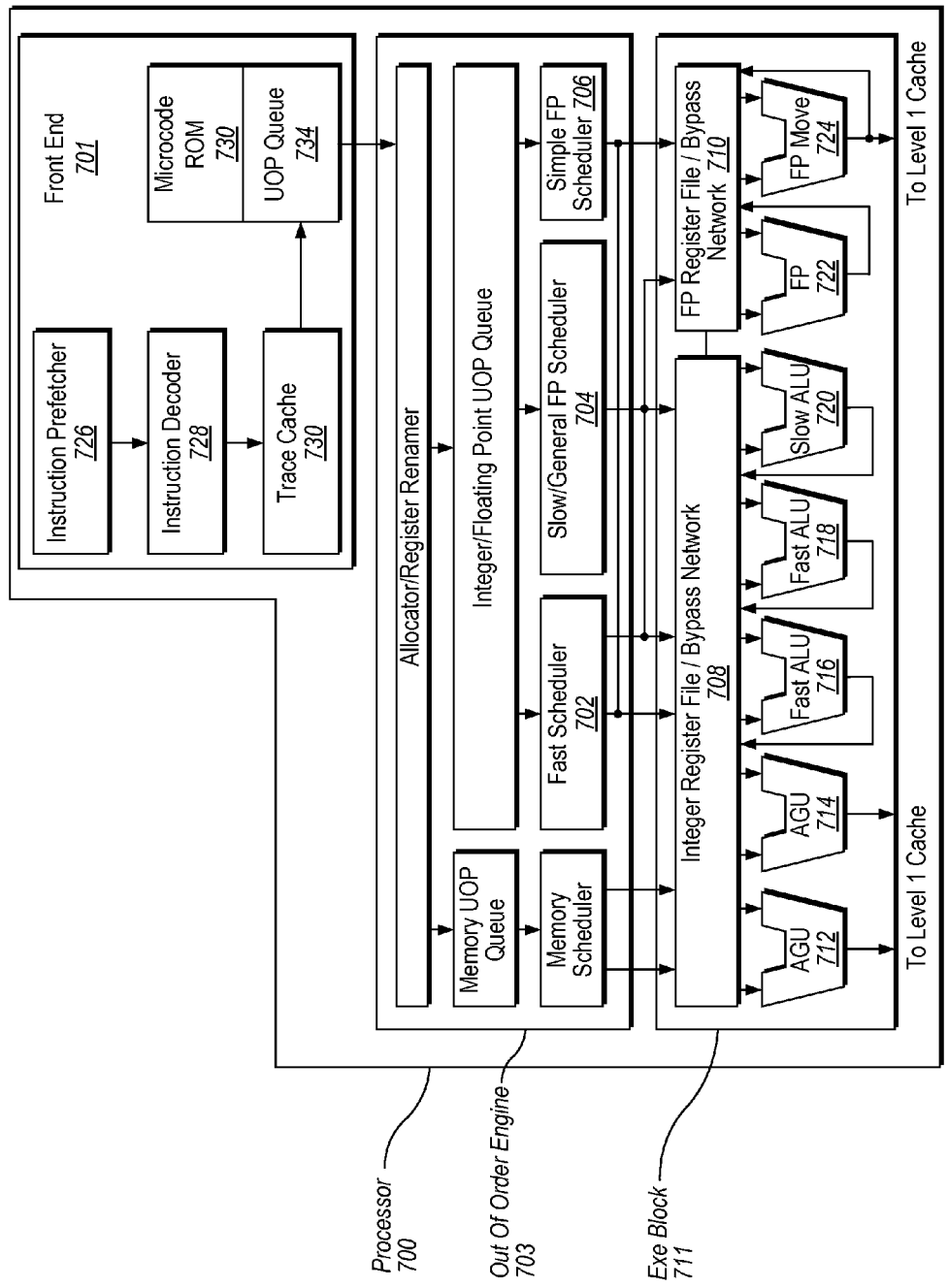
FIG. 7 illustrates a block diagram of the micro-architecture for a processor that includes logic circuits to implement unbounded transactional memory with forward progress guarantees using a hardware global lock in accordance with one embodiment of the disclosure.

FIG. 7 illustrates a block diagram of the micro-architecture for a processor 700 that includes logic circuits to implement unbounded transactional memory with forward progress guarantees using a hardware global lock in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store address prediction for memory disambiguation according to embodiments of the disclosure. In one embodiment, the execution block 711 of processor 700 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
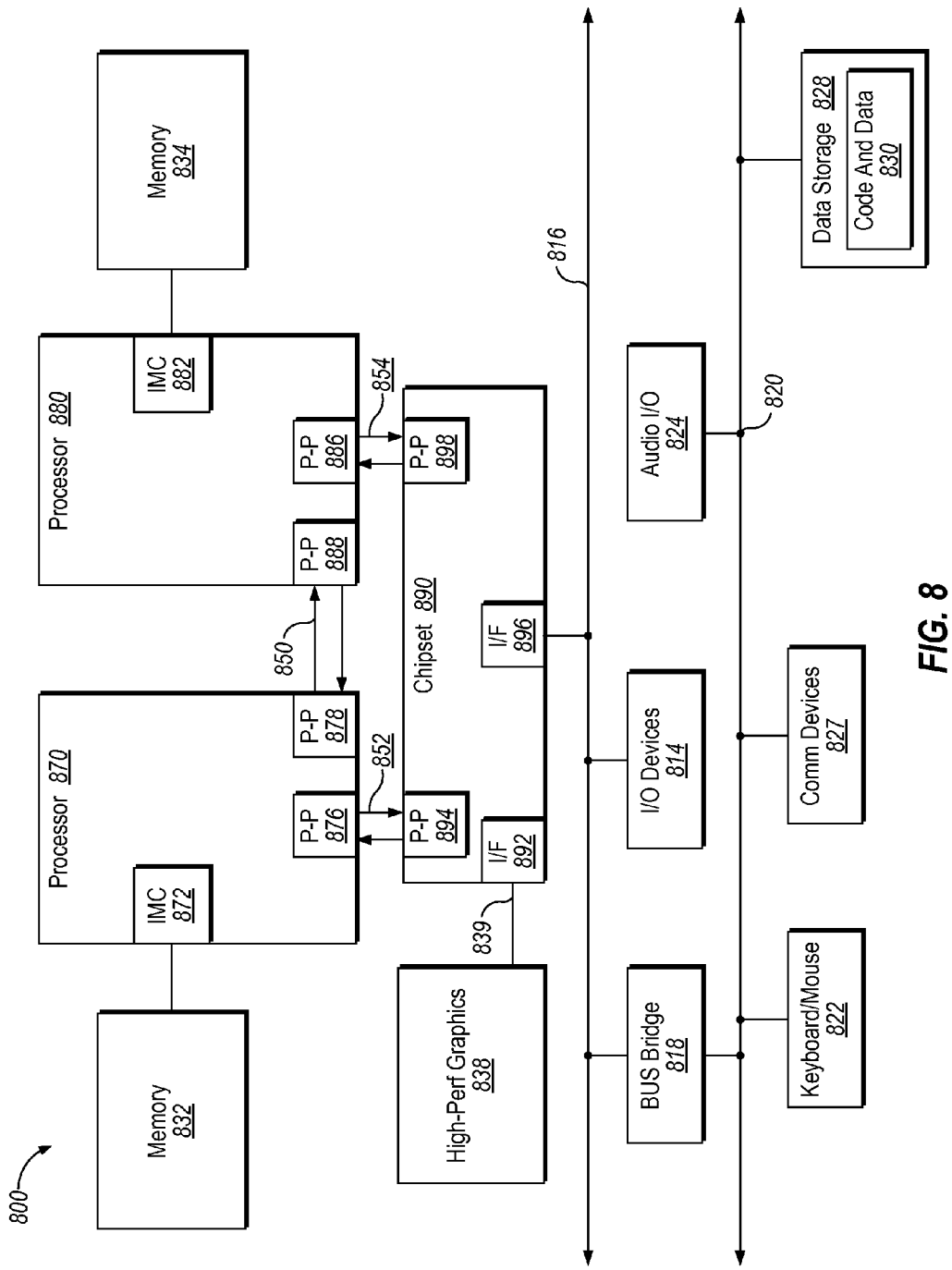
FIG. 8 is a block diagram illustrating a system in which an embodiment of the disclosure may be used.

Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement unbounded transactional memory with forward progress guarantees using a hardware global lock as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
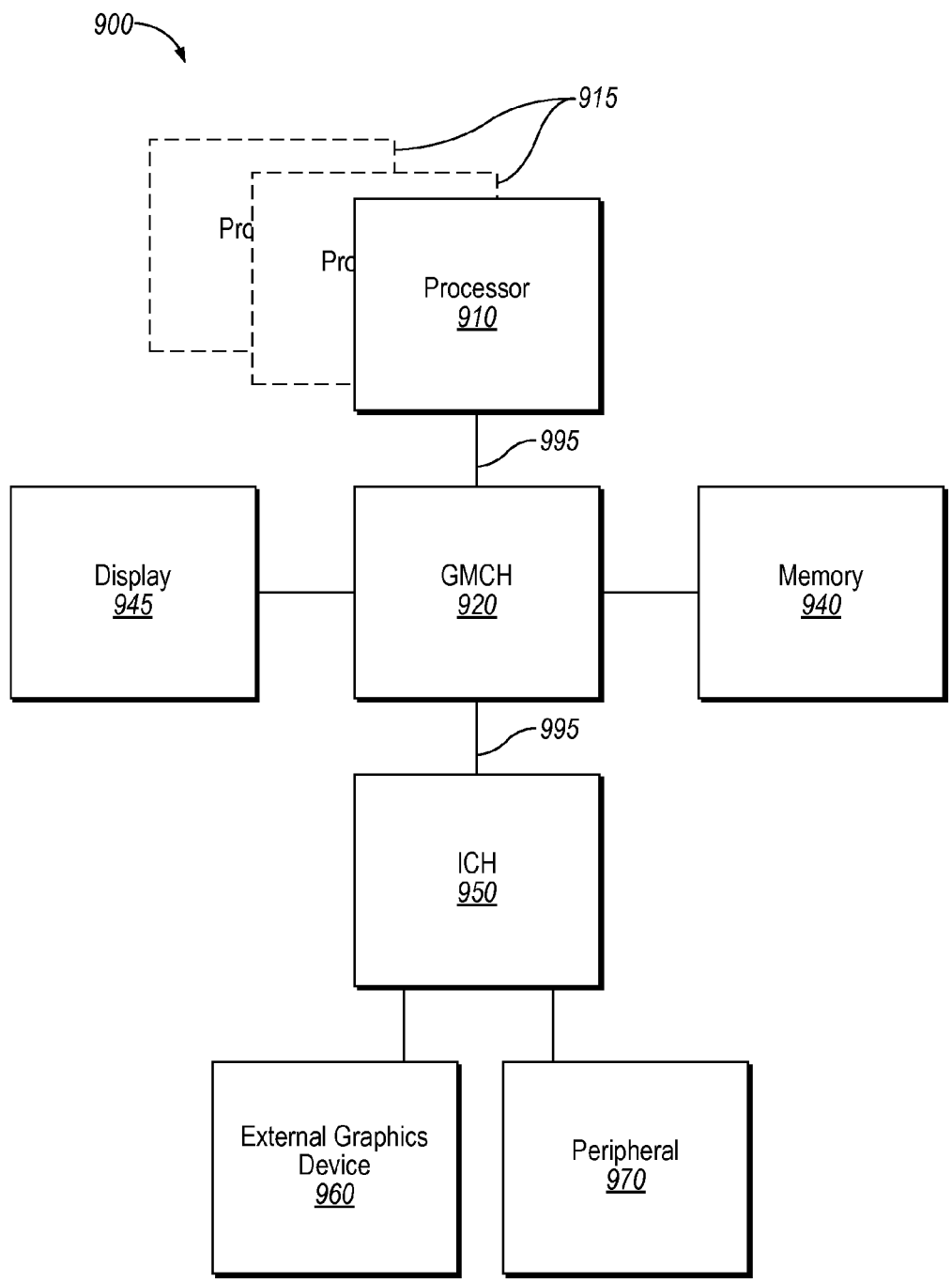
FIG. 9 is a block diagram of a system in which an embodiment of the disclosure may operate.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 implement unbounded transactional memory with forward progress guarantees using a hardware global lock according to embodiments of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a frontside bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
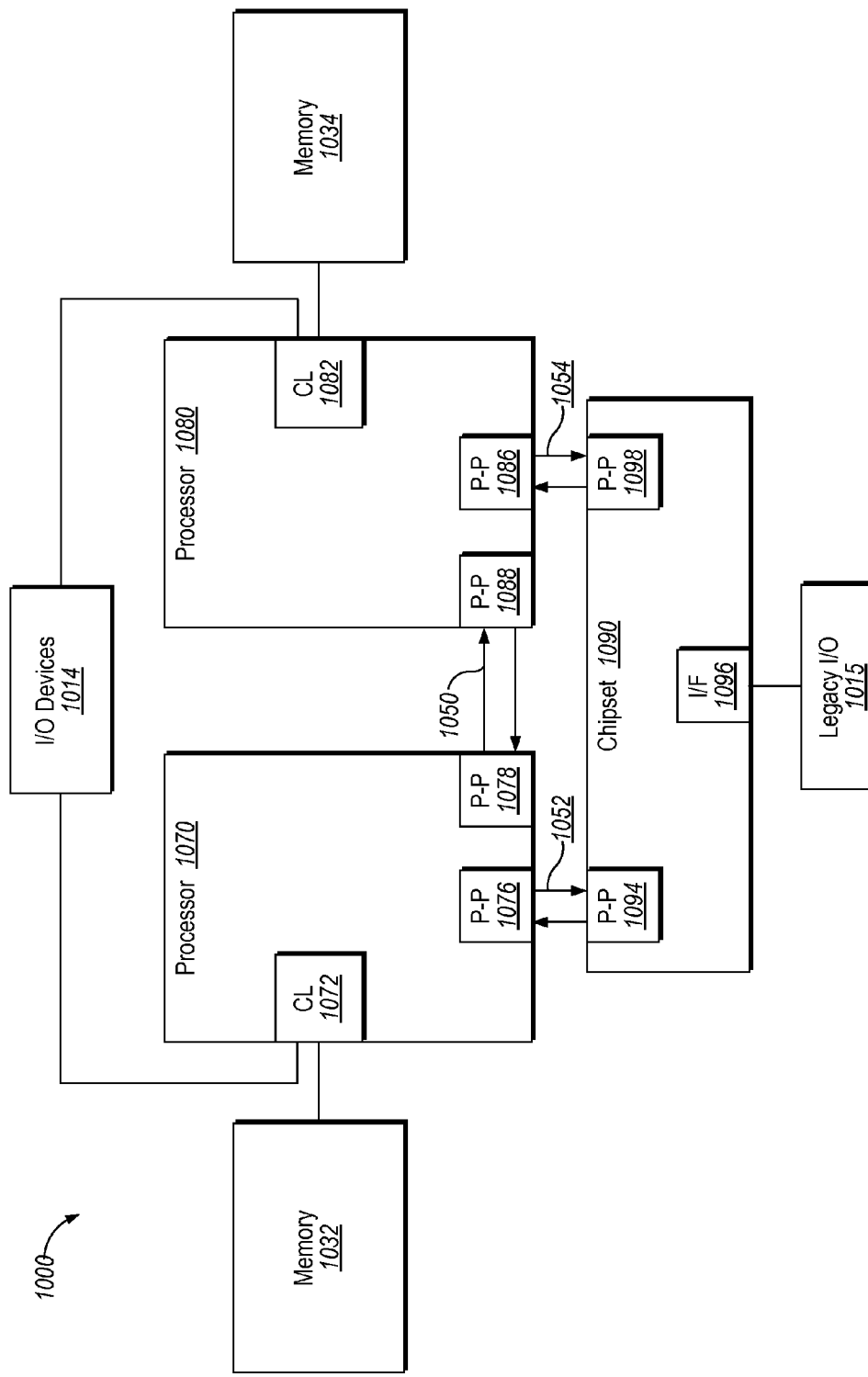
FIG. 10 is a block diagram of a system in which an embodiment of the disclosure may operate.

Referring now to FIG. 10, shown is a block diagram of a system 1000 in which an embodiment of the disclosure may operate. FIG. 10 illustrates processors 1070, 1080. In one embodiment, processors 1070, 1080 may implement unbounded transactional memory with forward progress guarantees using a hardware global lock as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
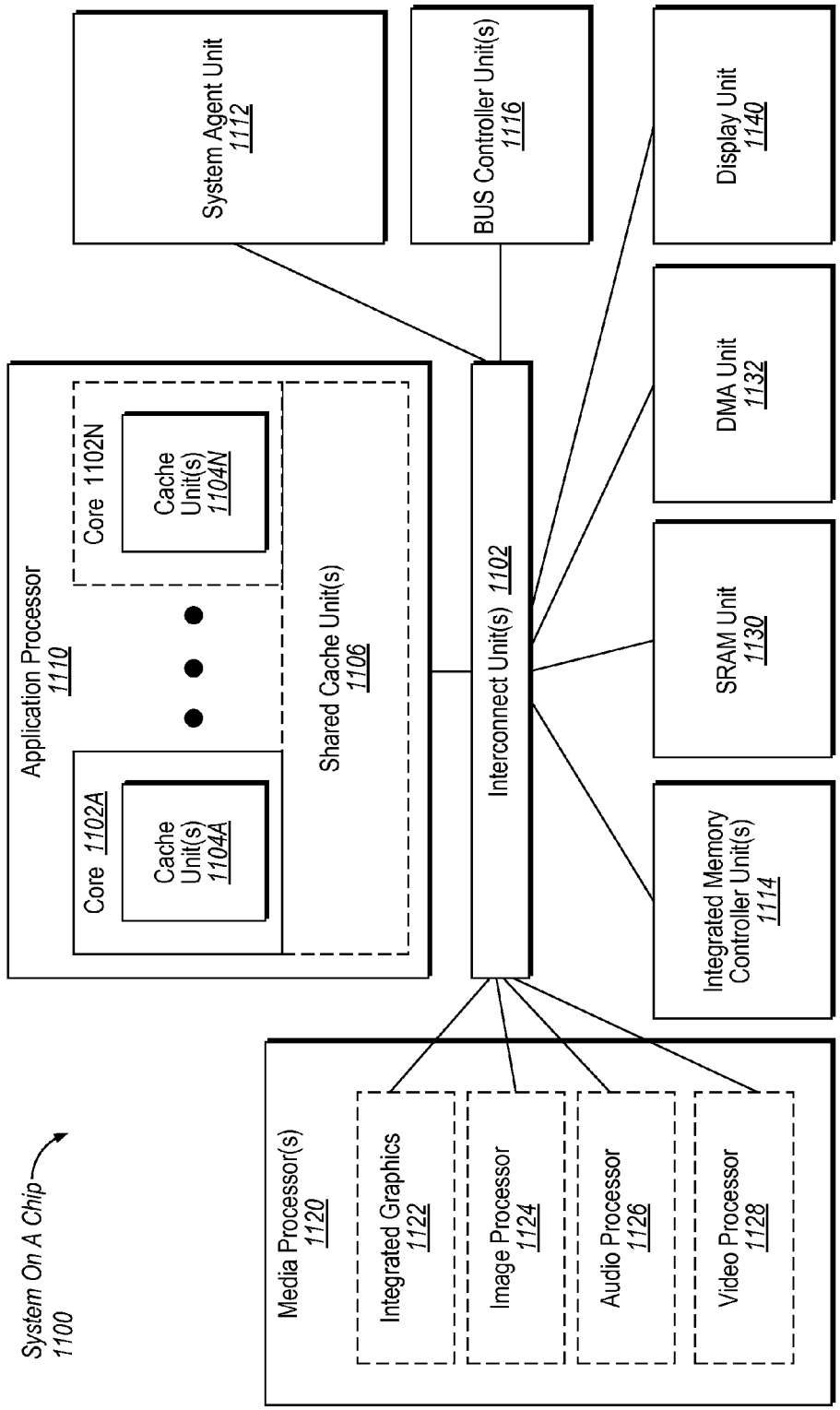
FIG. 11 is a block diagram of a System-on-a-Chip (SoC) in accordance with an embodiment of the present disclosure

Embodiments may be implemented in many different system types. FIG. 11 is a block diagram of a SoC 1100 in accordance with an embodiment of the present disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1112; a bus controller unit(s) 1116; an integrated memory controller unit(s) 1114; a set of one or more media processors 1120 which may include integrated graphics logic 1122, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The application processor 1110 may include unbounded HTM components for implementing unbounded transactional memory with forward progress guarantees using a hardware global lock as described in embodiments herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multi-threading. The system agent 1112 includes those components coordinating and operating cores 1102A-N. The system agent unit 1112 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1110 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1110 may be from another company, such as ARM Holdings™, Ltd, MIPS™, etc. The application processor 1110 may be a special-purpose processor, such as, for example, a network or communication processor, compression engine, graphics processor, co-processor, embedded processor, or the like. The application processor 1110 may be implemented on one or more chips. The application processor 1110 may be a part of and/or may be implemented on one or more substrates using any of a number of process technologies, such as, for example, BiCMOS, CMOS, or NMOS.

Figure 12:
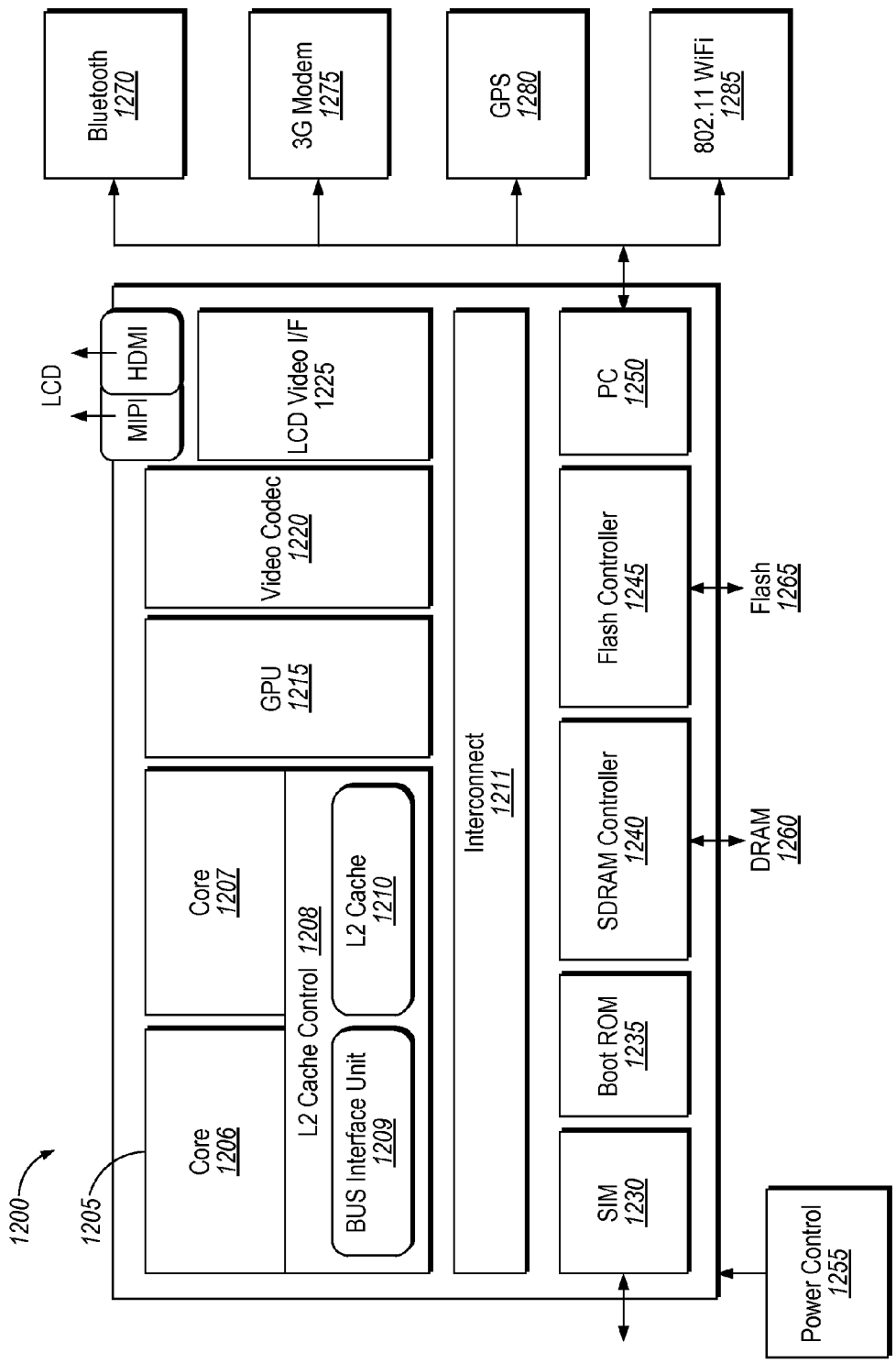
FIG. 12 is a block diagram of an embodiment of a SoC design in accordance with the present disclosure.

FIG. 12 is a block diagram of an embodiment of a system on-chip (SoC) design in accordance with the present disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may implement unbounded transactional memory with forward progress guarantees using a hardware global lock as described in embodiments herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1285.

Figure 13:
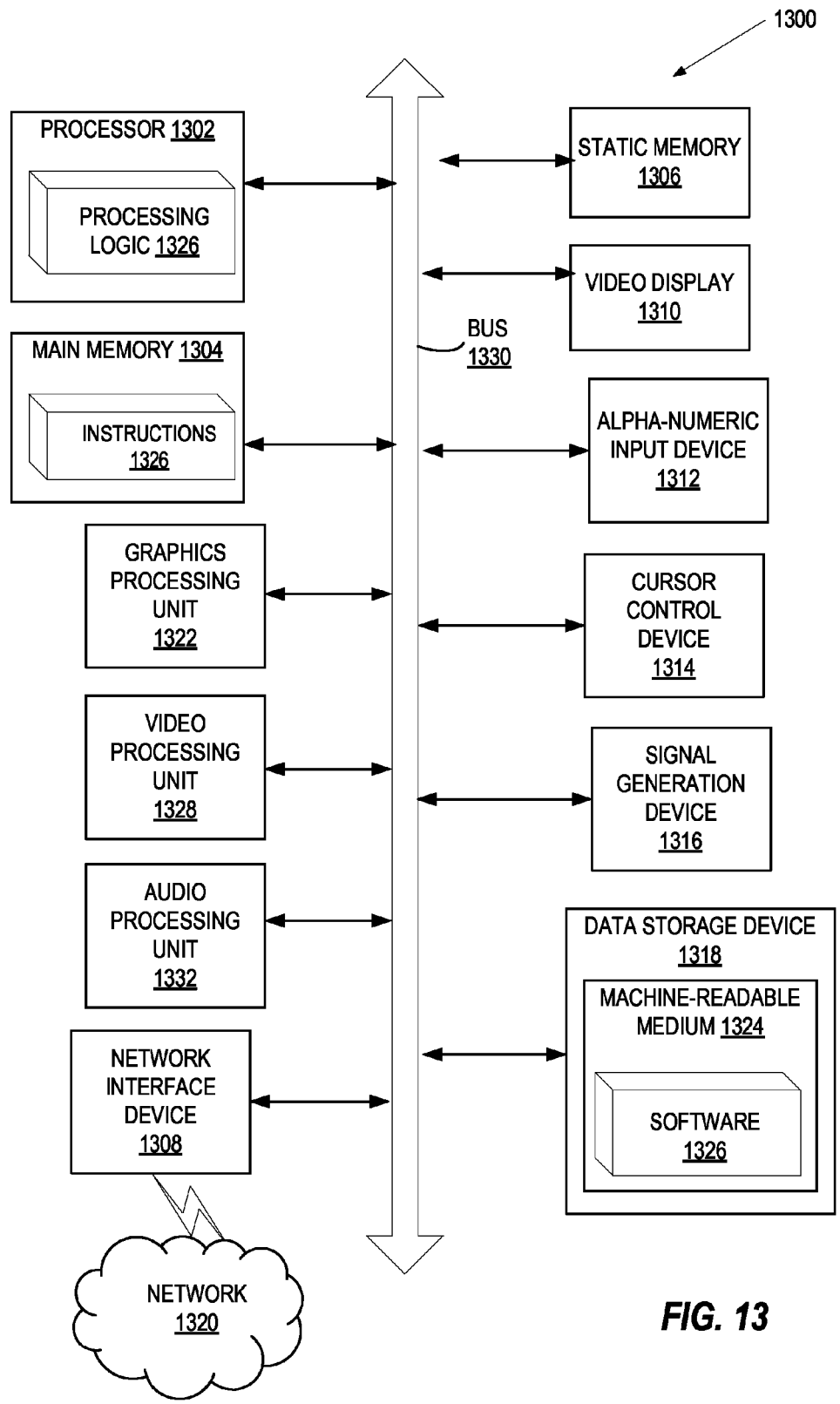
FIG. 13 illustrates a block diagram of one embodiment of a computer system.

FIG. 13 illustrates a diagrammatic representation of a machine in the example form of a computer system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the processing logic 1326 for performing the operations and steps discussed herein. In one embodiment, processing device 1302 is the same as processor architecture 100 described with respect to FIG. 1 that implements unbounded transactional memory with forward progress guarantees using a hardware global lock as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing store address prediction for memory disambiguation as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media.

The machine-readable storage medium 1324 may also be used to store instructions 1326 implementing unbounded transactional memory with forward progress guarantees using a hardware global lock such as described with respect to processing cores 106 in FIGS. 1 and 2, and/or a software library containing methods that call the above applications. While the machine-accessible storage medium 1324 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing device for implementing unbounded transactional memory with forward progress guarantees using a hardware global lock. Further to Example 1, the processing device comprises a hardware transactional memory (HTM) hardware contention manager to cause a bounded transaction to be translated to an unbounded transaction, the unbounded transaction to acquire a global hardware lock for the unbounded transaction, the global hardware lock read by bounded transactions that abort when the global hardware lock is taken. The processing device further comprises an execution unit communicably coupled to the HTM hardware contention manager to execute a instructions of the unbounded transaction without speculation, the unbounded transaction to release the global hardware lock upon completion of execution of the instructions.

In Example 2, the subject matter of Example 1 can optionally include wherein the HTM hardware contention manager to refer to a re-try policy to determine when to translate the bounded transaction to an unbounded transaction. In Example 3, the subject matter of any one of Examples 1-2 can optionally include further comprising an HTM re-try counter that is referenced by the HTM hardware contention manager as part of the re-try policy, wherein when the HTM re-try counter associated with the bounded transaction exceeds a re-try threshold, the HTM hardware contention manager to cause the translation of the bounded transaction to the unbounded transaction. In Example 4, the subject matter of any one of Examples 1-3 can optionally include wherein the bounded transaction is translated to the unbounded transaction upon occurrence of an abort condition caused by a conflict and the HTM re-try counter exceeding the re-try threshold.

In Example 5, the subject matter of any one of Examples 1-4 can optionally include wherein the bounded transaction is translated to the unbounded transaction upon occurrence of an abort condition comprising at least one of an unsupported instruction or an overflow condition. In Example 6, the subject matter of any one of Examples 1-5 can optionally include wherein the bounded transactions read the global hardware lock prior to speculative execution of instructions of the bounded transactions. In Example 7, the subject matter of any one of Examples 1-6 can optionally include wherein the bounded transactions read the global hardware lock as part of a commit procedure subsequent to speculative execution of instructions sections of the bounded transactions.

In Example 8, the subject matter of any one of Examples 1-7 can optionally include wherein the global hardware lock is maintained in main memory associated with the processing device. In Example 9, the subject matter of any one of Examples 1-8 can optionally include wherein a storage for a CPU identifier (ID) is associated with the global hardware lock and stores a CPU ID corresponding to the CPU of the thread executing the unbounded transaction that acquires the global hardware lock. In Example 10, the subject matter of any one of Examples 1-9 can optionally include wherein the execution of the instructions of the unbounded transaction guarantees forward progress of the processing device as the unbounded transactions cannot be aborted and as the bounded transaction become unbounded transactions at least when aborted a predetermined number of times. All optional features of the apparatus described above may also be implemented with respect to the method or process described herein.

Example 11 is a method for implementing unbounded transactional memory with forward progress guarantees using a hardware global lock comprising translating a bounded transaction to an unbounded transaction, acquiring a global hardware lock for the unbounded transaction, the global hardware lock read by bounded transactions that abort when the global hardware lock is taken, executing instructions of the unbounded transaction without speculation, and releasing the global hardware lock. In Example 12, the subject matter of any one of Example 11 can optionally include further comprising referring to a re-try policy to determine when to translate the bounded transaction to an unbounded transaction.

In Example 13, the subject matter of any one of Examples 11-12 can optionally include wherein an HTM re-try counter is referenced as part of the re-try policy, wherein when the HTM re-try counter associated with the bounded transaction exceeds a re-try threshold, the bounded transaction is transformed into the unbounded transaction. In Example 14, the subject matter of any one of Examples 11-13 can optionally include wherein the bounded transaction is translated to the unbounded transaction upon occurrence of an abort condition caused by a conflict and the HTM re-try counter exceeding the re-try threshold.

In Example 15, the subject matter of any one of Examples 11-14 can optionally include wherein the bounded transaction is translated to the unbounded transaction upon occurrence of an abort condition comprising at least one of an unsupported instruction or an overflow condition. In Example 16, the subject matter of any one of Examples 11-15 can optionally include wherein the bounded transactions read the global hardware lock prior to speculative execution of instructions of the bounded transactions. In Example 17, the subject matter of any one of Examples 11-16 can optionally include wherein the bounded transactions read the global hardware lock as part of a commit procedure subsequent to speculative execution of instructions of the bounded transactions.

In Example 18, the subject matter of any one of Examples 11-17 can optionally include wherein the global hardware lock is maintained in main memory associated with the processing device. In Example 19, the subject matter of any one of Examples 11-18 can optionally include wherein a storage for a CPU identifier (ID) is associated with the global hardware lock and stores a CPU ID corresponding to the CPU of the thread executing the unbounded transaction that acquires the global hardware lock. In Example 20, the subject matter of any one of Examples 11-19 can optionally include wherein the execution of the instructions of the unbounded transaction guarantees forward progress of the processing device as the unbounded transactions cannot be aborted and s the bounded transaction become unbounded transactions at least when aborted a predetermined number of times.

Example 21 is a system for implementing unbounded transactional memory with forward progress guarantees using a hardware global lock. In Example 21, the system includes a memory for storing a global hardware lock and a processing device communicably coupled to the memory. Further to Example 21, the processing device is to translate a bounded transaction to an unbounded transaction, acquire the global hardware lock for the unbounded transaction, the global hardware lock read by bounded transactions that abort when the global hardware lock is taken, execute instructions of the unbounded transaction without speculation, and release the global hardware lock.

In Example 22, the subject matter of Example 21 can optionally include further comprising referring to a re-try policy to determine when to translate the bounded transaction to an unbounded transaction. In Example 23, the subject matter of any one of Examples 21-22 can optionally include wherein an HTM re-try counter is referenced as part of the re-try policy, wherein when the HTM re-try counter associated with the bounded transaction exceeds a re-try threshold, the bounded transaction is transformed into the unbounded transaction.

In Example 24, the subject matter of any one of Examples 20-22 can optionally include wherein the bounded transaction is translated to the unbounded transaction upon occurrence of an abort condition caused by a conflict and the HTM re-try counter exceeding the re-try threshold. In Example 25, the subject matter of any one of Examples 20-23 can optionally include wherein the bounded transaction is translated to the unbounded transaction upon occurrence of an abort condition comprising at least one of an unsupported instruction or an overflow condition.

In Example 26, the subject matter of any one of Examples 20-24 can optionally include wherein the bounded transactions read the global hardware lock prior to speculative execution of instructions of the bounded transactions. In Example 27, the subject matter of any one of Examples 20-25 can optionally include wherein the bounded transactions read the global hardware lock as part of a commit procedure subsequent to speculative execution of instructions of the bounded transactions. In Example 28, the subject matter of any one of Examples 20-26 can optionally include wherein the global hardware lock is maintained in main memory associated with the processing device.

In Example 29, the subject matter of any one of Examples 20-27 can optionally include wherein a storage for a CPU identifier (ID) is associated with the global hardware lock and stores a CPU ID corresponding to the CPU of the thread executing the unbounded transaction that acquires the global hardware lock. In Example 30, the subject matter of any one of Examples 20-28 can optionally include wherein the execution of the instructions of the unbounded transaction guarantees forward progress of the processing device as the unbounded transactions cannot be aborted and as the bounded transaction become unbounded transactions at least when aborted a predetermined number of times. All optional features of the system described above may also be implemented with respect to the method or process described herein.

Example 31 is a non-transitory computer-readable medium for implementing unbounded transactional memory with forward progress guarantees using a hardware global lock. In Example 31, the non-transitory machine-readable medium includes data that, when accessed by a processing device, cause the processing device to perform operations comprising translating a bounded transaction to an unbounded transaction, acquiring a global hardware lock for the unbounded transaction, the global hardware lock read by bounded transactions that abort when the global hardware lock is taken, executing instructions of the unbounded transaction without speculation, and releasing the global hardware lock.

In Example 32, the subject matter of Example 30 can optionally include further comprising referring to a re-try policy to determine when to translate the bounded transaction to an unbounded transaction. In Example 33, the subject matter of Examples 30-31 can optionally include wherein an HTM re-try counter is referenced as part of the re-try policy, wherein when the HTM re-try counter associated with the bounded transaction exceeds a re-try threshold, the bounded transaction is transformed into the unbounded transaction.

In Example 34, the subject matter of Examples 30-32 can optionally include wherein the bounded transaction is translated to the unbounded transaction upon occurrence of an abort condition caused by a conflict and the HTM re-try counter exceeding the re-try threshold. In Example 35, the subject matter of Examples 30-33 can optionally include wherein the bounded transaction is translated to the unbounded transaction upon occurrence of an abort condition comprising at least one of an unsupported instruction or an overflow condition.

In Example 36, the subject matter of Examples 30-34 can optionally include wherein the bounded transactions read the global hardware lock prior to speculative execution of instructions of the bounded transactions. In Example 37, the subject matter of Examples 30-35 can optionally include wherein the bounded transactions read the global hardware lock as part of a commit procedure subsequent to speculative execution of instructions of the bounded transactions. In Example 38, the subject matter of Examples 30-36 can optionally include wherein the global hardware lock is maintained in main memory associated with the processing device.

In Example 39, the subject matter of Examples 30-37 can optionally include wherein a storage for a CPU identifier (ID) is associated with the global hardware lock and stores a CPU ID corresponding to the CPU of the thread executing the unbounded transaction that acquires the global hardware lock. In Example 40, the subject matter of Examples 30-38 can optionally include wherein the execution of the instructions of the unbounded transaction guarantees forward progress of the processing device as the unbounded transactions cannot be aborted and as the bounded transaction become unbounded transactions at least when aborted a predetermined number of times.

Example 41 is an apparatus for implementing unbounded transactional memory with forward progress guarantees using a hardware global lock comprising means for translating a bounded transaction to an unbounded transaction, means for acquiring a global hardware lock for the unbounded transaction, the global hardware lock read by bounded transactions that abort when the global hardware lock is taken, means for executing instructions of the unbounded transaction without speculation, and means for releasing the global hardware lock. In Example 42, the subject matter of Example 41 can optionally include the apparatus further configured to perform the method of any one of the Examples 12 to 20.

Example 43 is at least one machine readable medium comprising a plurality of instructions that in response to being executed on a computing device, cause the computing device to carry out a method according to any one of Examples 11-20. Example 44 is an apparatus for implementing unbounded transactional memory with forward progress guarantees using a hardware global lock, configured to perform the method of any one of Examples 11-20. Example 45 is an apparatus for implementing unbounded transactional memory with forward progress guarantees using a hardware global lock comprising means for performing the method of any one of Examples 11 to 20. Specifics in the Examples may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   translating, by a processor, a speculative transaction among a plurality of speculative transactions in a hardware transactional memory (HTM) to a non-speculative transaction;
   acquiring a global hardware lock for the non-speculative transaction, wherein a storage for a central processing unit (CPU) identifier (ID) is associated with the global hardware lock and stores the CPU ID corresponding to a CPU core for a thread executing the non-speculative transaction that acquires the global hardware lock, wherein instructions of remaining ones of the speculative transactions are executed speculatively and mark transactional bits in a cache for a cache coherency protocol of the HTM, wherein the global hardware lock is to be read by the remaining ones of the speculative transactions as part of a commit procedure subsequent to speculative execution that abort if the global hardware lock has been acquired, and wherein instructions of the non-speculative transaction are not executed speculatively and do not mark transactional bits in the cache;
   executing the instructions of the non-speculative transaction without speculation while the global hardware lock has been acquired for the non-speculative transaction; and
   releasing the global hardware lock and clearing the CPU ID from the storage upon completion of the execution of the instructions of the non-speculative transaction and in response to determining that the CPU ID of the CPU core executing the non-speculative transaction matches the CPU ID in the storage associated with the global hardware lock.

2. The method of claim 1, further comprising referring to a re-try policy to determine when to translate the speculative transaction to the non-speculative transaction, referencing an HTM re-try counter as part of the re-try policy, and translating the speculative transaction to the non-speculative transaction when the HTM re-try counter associated with the speculative transaction exceeds a re-try threshold.

3. The method of claim 2, wherein the speculative transaction is translated to the non-speculative transaction upon occurrence of an abort condition caused by a conflict and the HTM re-try counter exceeding the re-try threshold.

4. The method of claim 1, wherein the speculative transaction is translated to the non-speculative transaction upon occurrence of an abort condition comprising at least one of an unsupported instruction or an overflow condition.

5. The method of claim 1, wherein the global hardware lock is maintained in main memory associated with the processor.

6. A system comprising:
   a memory to store a global hardware lock; and
   a processor communicably coupled to the memory to:
   translate a speculative transaction among a plurality of speculative transactions in a hardware transactional memory (HTM) to a non-speculative transaction;
   acquire a global hardware lock for the non-speculative transaction, wherein a storage for a central processing unit (CPU) identifier (ID) is associated with the global hardware lock and stores the CPU ID corresponding to a CPU core for a thread executing the non-speculative transaction that acquires the global hardware lock, wherein instructions of remaining ones of the speculative transactions are executed speculatively and mark transactional bits in a cache for a cache coherency protocol of the HTM, wherein the global hardware lock is to be read by the remaining ones of the speculative transactions as part of a commit procedure subsequent to speculative execution that abort if the global hardware lock has been acquired, and wherein instructions of the non-speculative transaction are not executed speculatively and do not mark transactional bits in the cache;

execute the instructions of the non-speculative transaction without speculation while the global hardware lock has been acquired for the non-speculative transaction; and release the global hardware lock and clear the CPU ID from the storage upon completion of the execution of the instructions of the non-speculative transaction and in response to a determination that the CPU ID of the CPU core executing the non-speculative transaction matches the CPU ID in the storage associated with the global hardware lock.

7. The system of claim 6, wherein the processor is to refer to a re-try policy to determine when to translate the speculative transaction to the non-speculative transaction, wherein the processor is further to reference an HTM re-try counter as part of the re-try policy, wherein the processor is to translate the speculative transaction to the non-speculative transaction when the HTM re-try counter associated with the speculative transaction exceeds a re-try threshold.

8. The system of claim 7, wherein the processor is to translate the speculative transaction to the non-speculative transaction upon occurrence of an abort condition caused by a conflict and the HTM re-try counter exceeding the re-try threshold.

9. The system of claim 6, wherein the processor is to translate the speculative transaction to the non-speculative transaction upon occurrence of an abort condition comprising at least one of an unsupported instruction or an overflow condition.

10. The system of claim 6, wherein the global hardware lock is maintained in main memory associated with the processor.

11. A processing device comprising:

a hardware transactional memory (HTM) hardware contention manager component to cause a speculative transaction among a plurality of speculative transactions in an HTM to be translated to a non-speculative transaction, wherein the non-speculative transaction is to acquire a global hardware lock for the non-speculative transaction, wherein a storage for a central processing unit (CPU) identifier (ID) is associated with the global hardware lock and stores the CPU ID corresponding to a CPU core for a thread executing the non-speculative transaction that acquires the global hardware lock, wherein instructions of remaining ones of the speculative transactions are executed speculatively and mark transactional bits in a cache for a cache coherency protocol of the HTM, wherein the global hardware lock is to be read by the remaining ones of the speculative transactions as part of a commit procedure subsequent to speculative execution that abort if the global hardware lock has been acquired, and wherein instructions of the non-speculative transaction are not executed speculatively and do not mark transactional bits in the cache; and an execution unit communicably coupled to the HTM hardware contention manager component to execute the instructions of the non-speculative transaction without speculation while the global hardware lock has been acquired for the non-speculative transaction, wherein the non-speculative transaction is to release the global hardware lock and clear the CPU ID from the storage upon completion of the execution of the instructions of the non-speculative transaction and in response to a determination that the CPU ID of the CPU core executing the non-speculative transaction matches the CPU ID in the storage associated with the global hardware lock.

12. The processing device of claim 11, wherein the HTM hardware contention manager component is further to refer to a re-try policy to determine when to translate the speculative transaction to the non-speculative transaction.

13. The processing device of claim 12, wherein the HTM hardware contention manager component is further to reference an HTM re-try counter as part of the re-try policy, and wherein the HTM hardware contention manager component is to cause the translation of the speculative transaction to the non-speculative transaction when the HTM re-try counter associated with the speculative transaction exceeds a re-try threshold.

14. The processing device of claim 13, wherein the speculative transaction is translated to the non-speculative transaction upon occurrence of an abort condition caused by a conflict and the HTM re-try counter exceeding the re-try threshold.

15. The processing device of claim 11, wherein the speculative transaction is translated to the non-speculative transaction upon occurrence of an abort condition comprising at least one of an unsupported instruction or an overflow condition.

16. The processing device of claim 11, wherein the global hardware lock is maintained in main memory associated with the processing device.

17. The processing device of claim 11, wherein the execution of the instructions of the plurality of speculative transactions provides forward progress of the processing device as the non-speculative transaction cannot be aborted due to speculative execution and as the speculative transaction becomes the non-speculative transaction at least when aborted a predetermined number of times.

* * * * *